(12) United States Patent
Cui et al.

(10) Patent No.: US 8,375,029 B2
(45) Date of Patent: Feb. 12, 2013

(54) DATA PROCESSING

(75) Inventors: Zhan Cui, Colchester (GB); Behnam Azvine, Ipswich (GB)

(73) Assignee: British Telecommunications public limited company, London (GB)

( * ) Notice: Subject to any disclaimer, the term of this patent is extended or adjusted under 35 U.S.C. 154(b) by 303 days.

(21) Appl. No.: 12/447,283

(22) PCT Filed: Oct. 31, 2007

(86) PCT No.: PCT/GB2007/004155
§ 371 (c)(1),
(2), (4) Date: Apr. 27, 2009

(87) PCT Pub. No.: WO2008/053212
PCT Pub. Date: May 8, 2008

(65) Prior Publication Data
US 2010/0070500 A1    Mar. 18, 2010

(30) Foreign Application Priority Data
Oct. 31, 2006   (EP) ..................................... 06255598

(51) Int. Cl.
*G06F 17/30*   (2006.01)
(52) U.S. Cl. ........................................ 707/736; 707/718
(58) Field of Classification Search .................. 707/736, 707/718
See application file for complete search history.

(56) References Cited

U.S. PATENT DOCUMENTS

| | | | |
|---|---|---|---|
| 7,761,480 B2 * | 7/2010 | Toledano et al. | ............. 707/804 |
| 2002/0133504 A1 | 9/2002 | Vlahos et al. | |
| 2005/0222810 A1 | 10/2005 | Buford et al. | |
| 2005/0222931 A1 * | 10/2005 | Mamou et al. | ................... 705/35 |
| 2006/0248045 A1 * | 11/2006 | Toledano et al. | ................. 707/2 |
| 2010/0287158 A1 * | 11/2010 | Toledano et al. | ............. 707/718 |

FOREIGN PATENT DOCUMENTS

| | | |
|---|---|---|
| AU | 2002100233 A4 | 6/2002 |
| WO | 95/27254 | 10/1995 |
| WO | WO 9527254 A1 * | 10/1995 |

(Continued)

OTHER PUBLICATIONS

International Search Report for PCT/GB2007/004155, mailed Dec. 4, 2007.

(Continued)

*Primary Examiner* — John E Breene
*Assistant Examiner* — Joshua Bullock
(74) *Attorney, Agent, or Firm* — Nixon & Vanderhye P.C.

(57) ABSTRACT

A system for processing data comprising: a plurality of resource interfaces each of which is operable to access a corresponding underlying resource, and a processor unit for integrating data accessed from the underlying resources and controlling a user interface. The user interface is operable in use to permit a user to view all of the underlying resources currently accessible to the system and to select a plurality of these to form a subset comprising some, but not all, of the underlying resources from which to form an integrated view of the sub-set. The processor unit is operable to store the selection within a user selection store and to determine how to join the data from the selected underlying resources to generate an integrated view of the selected sub-set of underlying resources and to generate data for transmission to a device for displaying the generated view to the user.

10 Claims, 6 Drawing Sheets

FOREIGN PATENT DOCUMENTS

| | | |
|---|---|---|
| WO | 00/42553 | 7/2000 |
| WO | 02/080028 | 10/2002 |

OTHER PUBLICATIONS

Roth et al., "Don't Scrap It Wrap It¨ A Wrapper Architecture for Legacy Data Sources", Proceedings of the International Conference on Very Large Data Bases, Aug. 26, 1997, pp. 266-275, XP000940794.

Shou-Cheng Tseng et al., "A Probabilistic Approach to Query Processing in Heterogeneous Database Systems", Research Issues on Data Engineering, Feb. 2-3, 1992, Los Alamitos, CA, USA, IEEE, Comput. Soc., US, pp. 176-183, XP010027202.

Mena et al., "Observer: an Approach for Query Processing in Global Information Systems Based on Interoperation Across Pre-existing Ontologies", Cooperative Information Systems, Proceedings., First IFCIS International Conference on Brussels, Belgium, Jun. 19-21, 1996, Los Alamitos, CA, USA, IEEE Comput., pp. 14-25, XP010200745.

Roth et al., "Don't Scrap It Wrap It! A Wrapper Architecture for Legacy Data Sources", Proceedings of the International Conference on Very Large Data Bases, Aug. 26, 1997, pp. 266-275, XP000940794.

Russomanno, D. et al., "Building a Sensor Ontology: A Practical Approach Leveraging ISO and OGC Models," The 2005 International Conference on Artificial Intelligence, Las Vegas, Nevada 2005.

Boury-Brisset, Anne-Claire, Ontology-based Approach for Information Fusion, In Proceedings of the Sixth International Conference on Information Fusion, pp. 522-529, 2003.

Gorodetski, Vladimir et al., "Data Fusion and Semantic Web Mining: Meta-Models of Distributed Data and Decision Fusion," St. Petersburg Institute for Informatics and Automation, accessible from the Internet at http://www.kde.cs.uni-kassel.de/ws/semwebmine2002/papers/project/goro.pdf.

Gorodetski, Vladimir et al., "Multi-agent Data Fusion Systems: Design and Implementation Issues," St. Petersburg Institute for Informatics and Automation, 2002.

Kokar, Mieczyslaw M., et al., "Use Cases for Ontologies in Information Fusion" Lecture Notes in Economics and Mathematical Systems Series, Springer Verlag, available and from the internet at http://www.fusion2004.foi.se/papers/IF04-0415.pdf.

\* cited by examiner

DATA PROCESSING

This application is the U.S. national phase of International Application No. PCT/GB2007/004155 filed 31 Oct. 2007, which designated the U.S. and claims priority to European Application No. 06255598.2, filed 31 Oct. 2006, the entire contents of each of which are hereby incorporated by reference.

FIELD OF THE INVENTION

The present invention relates to a method of, and apparatus for, data processing. In particular, the present invention relates to a method of processing data from a plurality of heterogeneous data sources to provide an improved user interface for accessing the underlying data.

BACKGROUND TO THE INVENTION

There is a generally recognised problem often referred to as data overload and information poverty. This refers to the fact that although there is a vast amount of data stored in databases throughout the world at the present time, accessing and processing the data from various different databases, even where the are linked together by an appropriate data network, in order to obtain useful information from the databases is not straightforward. This is because the data tends to be stored in many different formats and in order to process the data appropriately (e.g. to combine data from different databases) considerable knowledge about the format of the data is required. (Note, the term database is used here loosely to refer to any type of electronically accessible storage of data, whether it be in a well structured format such as in a relational database or an object-oriented database, a semi-structured format such as a store of eXtensible Markup Language (XML) documents or in an unstructured form such as a plurality of electronic text document files, image files, video files, HyperText Markup Language (HTML) or other types of computer files, etc. The term database may be used interchangeably with the term "data source" throughout this document).

There has been much research into this area. A paper by Patrick Ziegler and Klaus A. Dittrich (2004) entitled "Three Decades of Data integration—All Problems Solved?" published in the proceedings of the World Computer Congress 2004—WCC 2004, 3-12, provides a good overview of research into this field and explains how there are many different architectural levels at which integration between heterogeneous data sources may be attempted. For example, at the lowest level it may be attempted by combining the data at the data storage level—this involves migrating the data from a plurality of separate data sources to a single database with a single interface for querying the database. Towards the other extreme, a user could be provided with a common user interface, but the underlying data remains transparently located in separate databases and the user must combine the information from the different databases him/herself.

The present applicant has previously developed a data integration system and methodology described in International published patent application: WO 02/080028. In this system, the heterogeneous data sources to be combined are maintained as separate databases and a series of wrappers are used to interface between the databases themselves and the system. The wrappers also translate or map queries expressed in a "resource" ontology to the query language/schema supported by the underlying resource (i.e. the underlying database). The system then maps between the resource ontology and a global ontology or an application specific ontology which the user uses to formulate global queries. Note that in this system, as in other systems of which the Applicant is aware, the system always seeks to integrate as many of the useful underlying heterogeneous data sources as possible.

SUMMARY OF THE INVENTION

According to a first aspect of the present invention, there is provided a system for processing data comprising: a resource interface for interfacing to a plurality of underlying resources; integration means and a user interface; wherein the user interface is operable in use to permit a user to view all of the underlying resources currently accessible to the system and to select a plurality of these to form a subset comprising some, but not all, of the underlying resources from which to form an integrated view of the sub-set; and wherein the integration means includes means for determining how to join the data from the underlying resources to identify an integrated view for the selected sub-set of underlying resources and passing this to the user interface for display to the user.

This provides a system over which the user has much greater control than has previously been possible. In particular, the present inventors have established that users often have a good understanding of the nature of the various resources available to them (often including various details about the resources which are unlikely to be known to an information technology specialist who may be responsible for performing data integration within an organisation, such as the operators involved in compiling the data, the length of time over which the data was compiled, the general level of perceived accuracy of the data in the resource, etc.) and are therefore in a good position to decide which databases are best suited to assisting the user in any particular task that he wants to perform. Providing them with the option of doing this can therefore result in a much more powerful system from the user's perspective.

Inherent in providing such a system, however, is the need for the system to be able to generate views of the selected databases on-the-fly. Furthermore, the views should be as integrated as possible, in the sense that where it is possible to join the data of the underlying resources, the view presented to the user should be one which shows the resources as already joined. Since this cannot be performed at design time, but rather must be performed at run-time, some heuristics are needed to guide the system as to the best possible way of performing such joins. Clearly where there is only one possible way of performing the join there is no issue (although the question of how best to present the view to the user remains—this is discussed in greater detail below), but the system needs a mechanism for deciding how best to perform a join when there are multiple possibilities.

Therefore, the integration means of the system preferably includes storage means for storing meta-data about each of the underlying resources for use in identifying an integrated view. Preferably the meta-data includes quality meta-data indicative of the perceived quality of the corresponding resource. This meta-data can then be used to help the system decide, on-the-fly, how best to perform a join when multiple possibilities exist.

Preferably the integration means is operable to generate a strategy for accessing underlying data from one or more of the underlying resources in response to a request for such data from the user and provide this to the user. Preferably, where a plurality of viable strategies exist for answering a user query, the integration means is operable to select one of the viable strategies in dependence upon the quality meta-data associated with each of the underlying resources.

In order to form an integrated view for presentation to the user, the system preferably operates in the following way:

It stores mappings between the underlying resources and a user ontology (there could be a number of these or there could be just one standard user ontology for use by the organisation as a whole, etc). Preferably, the system includes a mapping editor utility for assisting operators (either users or more technical IT staff) in producing such mappings and this is discussed in a little detail below.

For each of the selected resources, the mapping is used to identify which concepts in the user ontology are covered by the resources.

The system tries to integrate the resources into as few groups as possible (e.g. if three resources are selected and they can all be joined together (possibly via a non-selected resource), then just one group is formed; if the first and second resource can be joined but the third cannot, then two groups are formed.

For each group a pruned ontology is formed by pruning the user ontology to remove any concepts not covered by any of the resources in the group.

The or each pruned user ontology is then presented in a window in a tree-structure (similar to that used in many file-manager programs such as Microsoft's (Registered Trade Mark) "Explorer" file manager program, etc.), which the user can navigate through by double-clicking on individual nodes to open up any sub-nodes depending therefrom etc.

In one embodiment, each resource is associated with a main concept of the user ontology and each of these main concepts forms a starting point for a sub-tree formed down from the or each starting point. For example, suppose a user has selected the following three resources from which to form an integrated view: a customer database, an order database and a product database, which are associated with the following three concepts from the user ontology as the respective main concepts for these resources: customer, sales-order, product. An integrated view is presented to the user with the concept from the user ontology "Thing" as the root node, containing three sub-nodes, "customer", "sales-order", "product" only one of these is expanded (preferably the main concept of the first selected resource—i.e. "customer") but underneath each are the various sub-concepts which constitute attributes or sub-attributes of these concepts (e.g. "customer" may have attributes name, address, telephone number, orders made, products bought, etc.).

Preferably the system is operable to utilise underlying resources which include at least:

Structured databases such as relational databases and object-oriented databases

Collections of structured documents such as eXtensible Markup Language (XML) documents.

In the case of collections of XML documents (or similar documents containing tagged or marked-up data) the mapping information preferably maps concepts in the user ontology to meta-data (e.g. element and attribute names) contained in the XML documents. The mapping data also preferably specifies which parts of each type of XML document (as specified by a corresponding Document Type Definition (DTD) or XML. Schema) can be used for the purpose of joining to another type of XML document or to another resource in general (which need not be an XML or similar document).

Preferably, the integrated view presented to the user includes at least two distinct areas on the screen (realised, for example, by providing separate windows or frames), one of which displays only concepts contained in the pruned user ontology (or ontologies), and one of which displays data obtained from the underlying data resources. The latter window or frame (hereinafter the "results window") is preferably filled in dependence upon a combination of constraints or search queries entered by the user in combination with the highlighting of nodes in the former window or frame (hereinafter the "ontology window"). Preferably, a third area (i.e. a window or frame) (hereinafter the "query window") is used to specify a query which may conveniently be expressed in a Structured Query Language (SQL) or XQuery type format. Preferably, highlighting performed by the user in the ontology window can be interpreted by the system as an SQL or XQuery query which is then automatically produced and displayed in the query window. For example, highlighting the concept customer in the ontology window, could cause the system to display all of the records stored in the selected underlying resource "customer database". At the same time the SQL-type instruction for causing this data to be displayed would also be generated and placed in the query window (e.g. "SELECT*FROM customer"). Each window can be manipulated by the user and will cause corresponding changes to be made to the other windows as appropriate. For example, selecting a particular customer name as displayed in the results window could cause the name sub-concept to become highlighted in the ontology window, and for the query window to be changed, e.g. to read:

```
SELECT * FROM customer
WHERE customer.name = "John Smith"
``` or similar.

Preferably, the system is further operable to permit a user to manually determine how best the selected underlying resources should be joined, either to over-ride a decision made by the system automatically, or to assist the system where it has been unable to make such a determination. In this respect, it may be possible for the user to suggest matching functions indicating how best to match a portion of one resource (e.g. an attribute of an XML file, or a column in a relational database, etc.) to a corresponding portion of another resource, and possibly to indicate a preferred order in which said matching functions should be applied in order to determine correspondences between the separate resources.

According to a second aspect of the present invention, there is provided an interface device for interfacing between one or more underlying data resources comprising a plurality of electronic data files arranged in accordance with a common format (e.g. XML files) and an ontology based data processing system, the interface device including storage means for storing one or more mappings between meta data tag names (e.g. element and attribute names of a respective XML file or group of files conforming to a common format) and corresponding concept or attribute names of an ontology used in the ontology based data processing system.

Reference to a plurality of electronic data files conforming to a common format includes groups of XML files all corresponding to a particular XML schema file or DTD file or other similar file specifying a required format for a particular grouping of XML files.

Preferably the interface device includes an arrangement for conveniently generating a plurality of mappings for mapping between a plurality of types of electronic data files (e.g. XML files) and a common ontology, the arrangement including a store for storing a set of dictionary data comprising a one to many set of mappings in which at least one record maps a single concept or attribute of the ontology to a plurality of meta data tag names (e.g. element and/or attribute names of the XML files, schemes or DTD's) a store for storing a plurality of electronic data files of different types and/or information about the differing formats of the plurality of electronic data files of different types (e.g. XML files of different types or XML schema files) and processing means for comparing each type of electronic data file (e.g. each type of XML file), or each file describing format information about a respective type of electronic data file (e.g. each corresponding XML Schema), with the dictionary data to generate a corresponding mapping in respect of each type of electronic data file.

Further aspects of the present invention provide corresponding methods of interfacing to a plurality of heterogeneous resources, computer programs for causing such methods to be carried out and carrier means carrying such computer programs.

BRIEF DESCRIPTION OF THE DRAWINGS

In order that the present invention may be better understood, embodiments thereof will now be described, by way of example only, with reference to the accompanying drawings in which.

DETAILED DESCRIPTION

Figure 1:
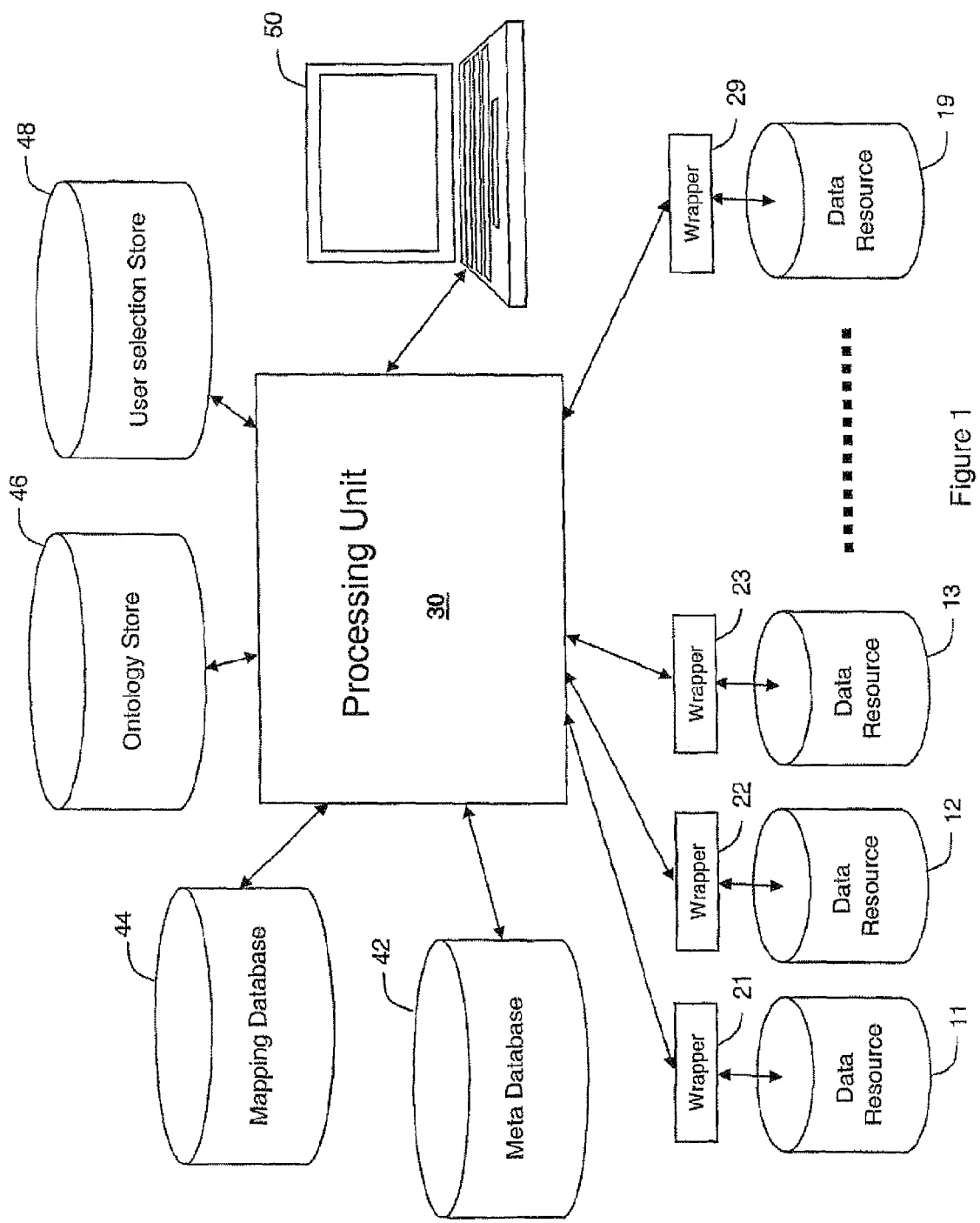
FIG. 1 is a block diagram illustrating in overview a system for interfacing between a user and a number of heterogeneous data resources according to the present invention.

FIG. 1 illustrates some of the main components of the interface system of an embodiment of the present invention. The interface system (21-29, 30, 42, 44, 46, 48) interfaces between a plurality of (heterogeneous) data resources 11, 12, 13, 19, and a user terminal 50.

The interface system includes a plurality of wrappers 21, 22, 23, . . . , 29 each of which connects to a respective corresponding data resource 11, 12, 13, . . . , 19; the wrappers interface between the interface system (which is largely ontology based) and the respective data resource (having a native query/response format for accessing data stored in the resource) in a manner discussed in greater detail below.

The wrappers 21, 22, 23, . . . , 29 communicate with a Processing Unit 30; the processing unit performs the data manipulation associated with the present invention and this is described in greater detail below.

Information used by the processing unit 30 is stored in various data stores to which it has access, namely a Meta Database store 42 which stores various information about each of the Data Resources 11-19; a Mapping Database store which stores mapping information for mapping between resource ontologies used by each of the wrappers and a central ontology and/or multiple user ontologies, and/or information for mapping between meta data of the underlying resources (e.g. database schemas, XML schemas, etc.) and either corresponding resource ontologies or directly to a common central ontology and/or multiple user ontologies; an Ontology Store 46 which stores a number of ontologies, including the resource ontologies and a central ontology and/or one or more user ontologies; and a User Selection Store 48 which stores details about a particular user session, including the set of selected resources for use in the session.

Finally, the interface system is able to communicate with an end user terminal 50; in one convenient embodiment the interface system is a server based system and the system communicates with the end user terminal 50 via Hyper Text Transfer Protocol (i.e. the interface system is a web server and the end user is a web client).

Figure 2:
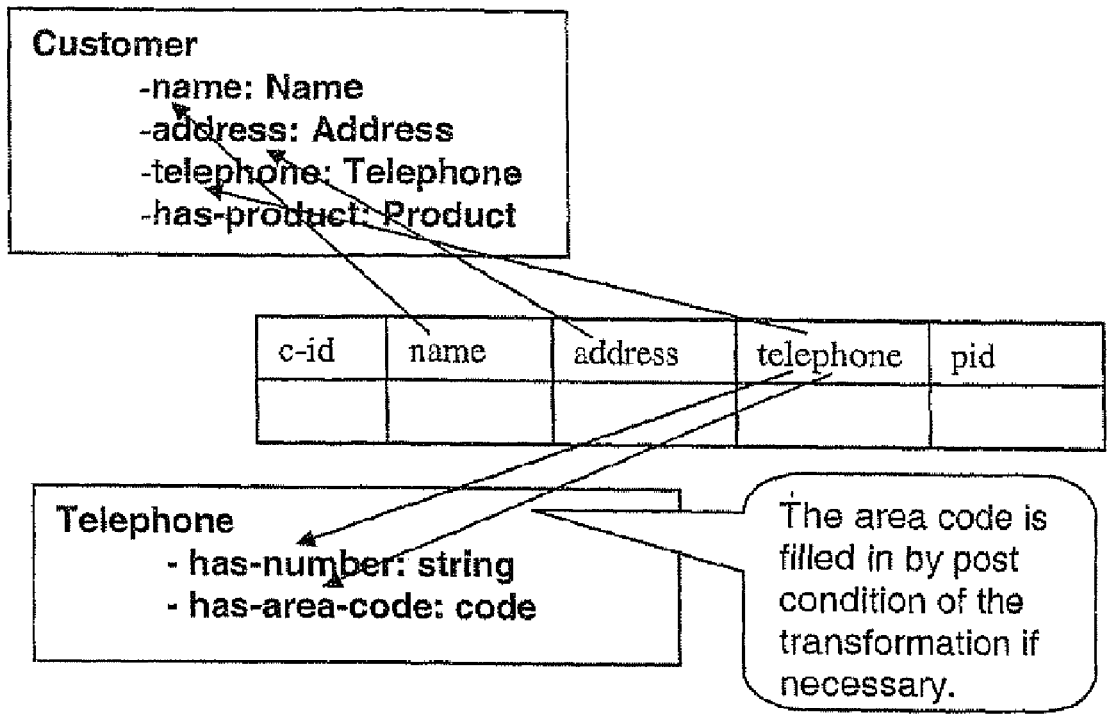
FIG. 2 is a mapping diagram illustrating a mapping between concepts of a user ontology and columns of a table in a relational database.
Figure 3:
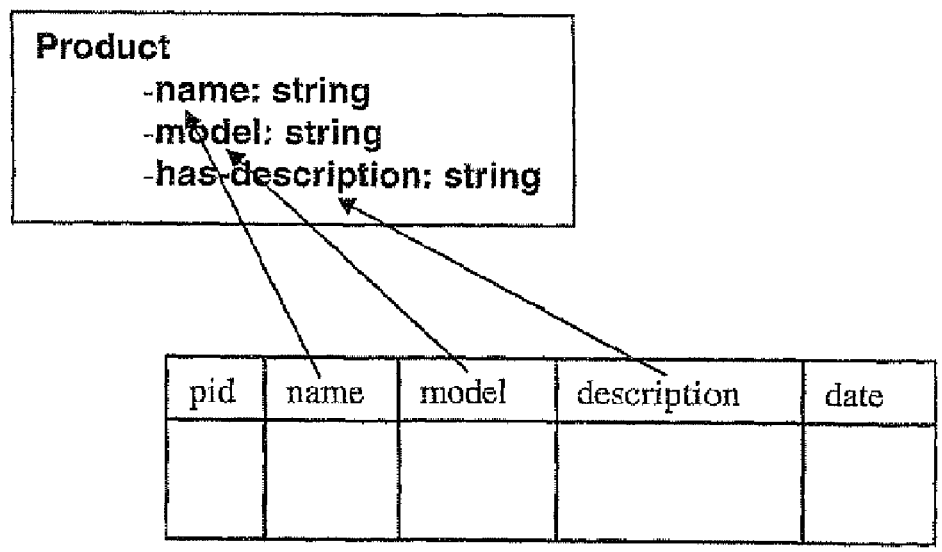
FIG. 3 is another mapping diagram illustrating a mapping between concepts of a user ontology and columns of a table in a relational database.
Figure 4:
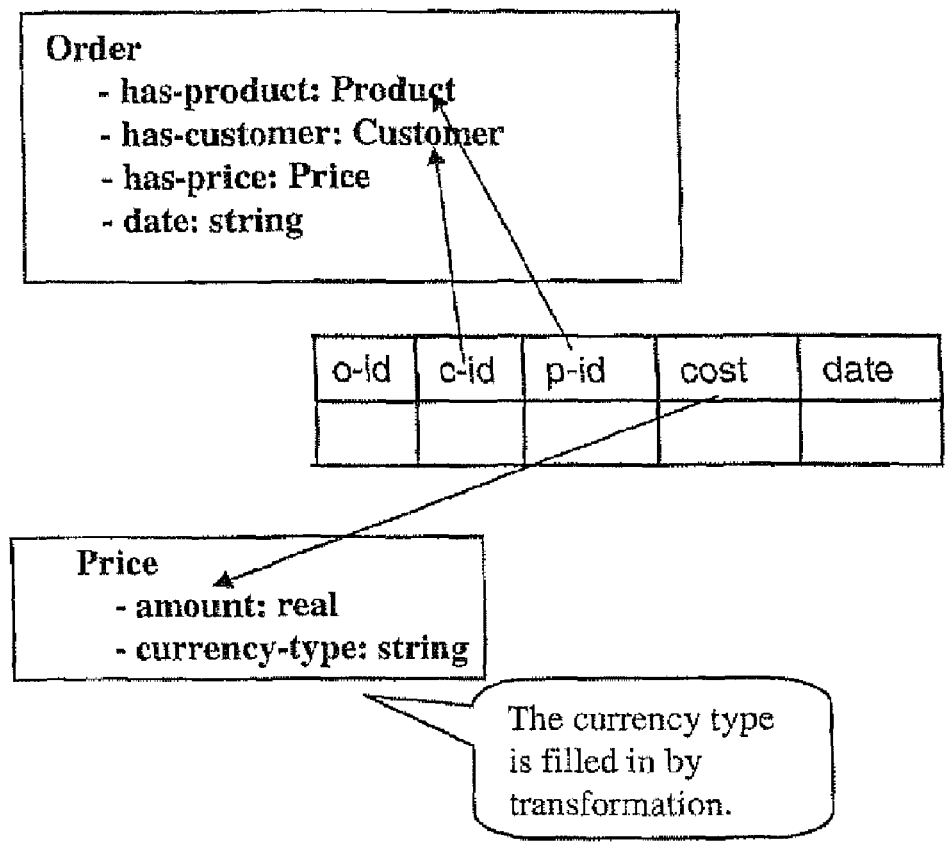
FIG. 4 is yet another mapping diagram illustrating a mapping between concepts of a user ontology and columns of a table in a relational database.

Referring now to FIGS. 2, 3 and 4, some examples will now be given of the type of data which may be stored in the underlying data resources (21-29), and in the Meta Database 42, the Mapping Database 44 and the Ontology Store 46.

Meta Database 42

The Meta Database 42 can be considered as a sort of semantic repository for storing the necessary metadata to enable plug and play of the underlying data resources and on-demand fusion of any of the underlying data resources when selected by a user. The Meta data stored for these purposes also includes quality data indicating a perceived level of the general quality, of the data stored in a particular resource. This could simply be entered by a user or it could be at least partially produced by automated data quality assessment modules.

As an example, the Meta Database could include the following database tables:
Data-Source-Metadata

| data-source-id | url | owner | creation-date | update-date | context-id |
|---|---|---|---|---|---|

Context-Data

| context-id | context | applications | update-date | status | type |
|---|---|---|---|---|---|

In the present example, the context column contains a description of the business area where the data are used for.

This could be a concept from a "context ontology" or any standard classification schema.

The applications column contains a list of applications where this data source has been used.

The update-date is the date the last time this entry has been updated.

The status column can take one of two possible values: active or inactive. These specify whether the underlying resource is currently available to the system (in case, for example, a network problem has caused the underlying resource to become temporarily unavailable.

The type column specifies the type of the underlying resource, e.g. data warehouse, transaction database, operational data store and others.

Data-Source-Quality

| data-resource-id | table-name | column-name | quality | quality-table-name |
|---|---|---|---|---|
| | | | | |

The above table (Data-source-quality) is for storing data quality information about each underlying data resource. The data-resource-id column contains a foreign key to the main data-source meta data table above; the table-name column contains the name of an individual table in the data resource (where the data resource is in the form of a relational database); the column name contains the name of an individual column of an individual table in the data resource; and the quality column contains a number indicative of the perceived level of quality of the respective column, ranging between 0 and 100 (where 0 means the data is completely unreliable and 100 means the data is completely reliable). The quality-table-name column contains a foreign key in the form of the name of a data-quality-details table where more details of the data quality may be found, if such a table is present. Where such a table is present, it may detail information such as whether or not the quality measure has been arrived at in an automated fashion or manually, and if in an automated fashion by what method (e.g. using a format based manually supplied filter, or using an automatic classifier such as a neural network, etc.)

There are other tables for storing user details, access rights, etc. However these are not used in the detailed technical descriptions below since an understanding of these tables is not necessary to achieving an understanding of the present invention.

Mapping Database

The Mapping Database stores data specifying mappings between different ontologies and between ontologies and schema (or other descriptions of) the underlying data resources. In the present embodiment, these mappings are stored in the form of several types of relational database tables as described below:

Data-Source-Business-View

| data-resource-id | ontology-name | mapping-details table name |
|---|---|---|
| | | |

The above data-source-business-view table stores an id of each data resource, the name of an ontology used to describe the contents of that data resource in the ontology based part of the interface system and the name of a mapping-details table where the detailed mappings of the database schema of the resource to the ontology are specified.

Mapping-Details Table

| table-name | Column-name | concept-name | attribute-name | Transformation-id |
|---|---|---|---|---|
| | | | | |

Note that in the present embodiment, there is a separate mapping-details table for each underlying data resource and each table may be stored in either or both of a corresponding wrapper and/or in the mapping database. The above mapping-details table is an example of a mapping between a relational database and an ontology (note an example of a mapping between an XML schema and an ontology is given below). Each row of the mapping-details table specifies a mapping between a column name of the relational database table and a concept or attribute of the ontology. As in the data-source-quality table, the table-name and column-name columns give the names of the table and column respectively for which a mapping is to be specified by the row. The concept name column holds the name of the concept to which the column of the data resource is to be mapped within the ontology (if it is mapped to a concept) while the attribute column holds the name of the attribute of the ontology to which the column (of the resource) is to be mapped (if it's mapped to an attribute of the ontology). The transformation-id is a foreign key which can be used to find the details of the transformation of the mapping from the transformation table shown below.

Transformation

| transformation-id | Expression |
|---|---|
| | |

The expression column stores the details of the transformation (where one is required to correctly map between the column of the resource and the concept or attribute of the ontology). The transformation-id is the primary key of this table.

Data Source Mappings

This section outlines some of the details of mappings between an ontology and data resource tables, using as examples a small portion of a simple ontology and a small number of relational database tables.

Ontology

Details of ontology definitions and uses are omitted here. This has been outlined in many public resources. For a discussion of a similar ontology processing system for integrating multiple heterogeneous data resources, see in particular copending international published patent application No. WO02/080026.

Example Ontology

For the following discussion of certain technical details of the ontology to data resource mappings used in the present system, it is assumed that the ontology contains the following concepts and attributes:

| | |
|---|---|
| Customer | (concept) |
| name: Name | (attribute) |
| address: Address | (attribute) |
| telephone: Telephone | (attribute) |
| has-product: Product | (attribute) |
| Product | (concept) |
| name: string | (attribute) |
| model: string | (attribute) |
| has-description: string | (attribute) |
| Price | (concept) |
| amount: real | (attribute) |
| currency-type: string | (attribute) |
| Order | (concept) |
| has-product: Product | (attribute) |
| has-customer: Customer | (attribute) |
| has-price: Price | (attribute) |
| date: string | (attribute) |
| Telephone | (concept) |
| has-number: string | (attribute) |
| has-area-code: Code | (attribute) |
| Address | (concept) |
| part-one: string | (attribute) |
| has-post-code: Code | (attribute) |

We have not included other concepts of the ontology and have not given any hierarchy of these concepts because they are not relevant to the present discussion of the system. Note however that some of the attributes point to other concepts of the ontology (e.g. the attribute has-customer (an attribute of the Order concept) points to the Customer concept, etc.).

Tables

The present example assumes that the underlying resources contain the following relational database tables. Please note these tables could be from the same database or from different databases and possibly even from totally separate data resources. In terms of notation, a tabular form is used in this document to indicate database tables, as opposed to ontology concepts. Furthermore, for the sake of clarity attribute types have been omitted except where relevant to understanding the present invention.

Customer-Details

| c-id | name | address | telephone | Pid |
|---|---|---|---|---|

Customer-id is the primary key of the Customer-details table.
pid is a foreign key to the product-details table.
The other columns are self-explanatory.

Product-Details

| pid | name | model | description | Date |
|---|---|---|---|---| pid is the primary key of the Product-details table, the other columns are again self-explanatory.

Order

| o-id | c-id | p-id | cost | date |
|---|---|---|---|---| o-id is the primary key of the Order table, c-id and p-id are foreign keys and the other columns are self-explanatory.

Mappings

Instead of populating the mapping tables detailed in the discussion of the Mappings database given above, FIGS. 2-4 use a graphical format to display the mappings for ease of comprehension. Please note the actual algorithms have to retrieve these mappings from the mapping tables. Please also note that we will use tabular forms to represent tables from databases in order to distinguish them from ontology concepts. The following tables could be from one single database or from multiple databases. Where they are coming from are clear in the context or clearly noted.

So, referring to FIG. 2, it is clear that the column "name" in the customer-details table is mapped to the attribute "name" of the "Customer" concept in the ontology. Similarly, the "address" column is mapped to the address attribute of the Customer concept. Note that the address attribute refers to the Address concept of the ontology (in general a notation is used in which concepts commence with a capital letter, while attributes do not—also, when the type is a simple type such as integer, string, floating point number, etc rather than a reference to a concept in the ontology, it also commences with a small letter); the mapping from the "address" column to the Address concept can therefore be thought of as a conceptual mapping since the actual values stored in the column cannot be mapped directly to the Address concept because individual items of data can only be stored as attributes of a concept (having a specified type). —some sort of further mapping or else a type transformation is required to enable a sensible mapping from the "address" column to the underlying attributes of the Address concept. In the present example, further mappings are specified which map the "address" column to each of the attributes of the Address concept (in the present example these are just part-one and has-post-code, but naturally different ontologies could have different Address concepts having details such as street name and number, town, area, country, etc.) however, these are not illustrated.

It is further clear from FIG. 2 that the "telephone" column in the customer details table is mapped conceptually to the Telephone concept in the ontology. It is further illustrated in FIG. 2 that there are then further mappings from the column "telephone" to the two attributes of the Telephone concept, namely the has-number attribute (which is a string) and the has-area-code attribute which is of type Code (a concept of the Ontology used for storing codes which are required to have a predictable format, e.g. UK telephone area codes should begin with a zero and comprise either 3, 4 or 5 digits in total). If we assume that telephone numbers are normally stored in the customer details table as strings including both the area code and the actual telephone number, then some logic is required to map this combined info into the two separate attributes of the Telephone concept—depending on the variability of how the number is written in the customer details table this may require little or considerable complexity as will be appreciated by the skilled reader).

Also note that the columns which contain the primary and foreign keys (i.e. the "c-id" column and the "pid" column) are not mapped because there are no corresponding attributes for these in the ontology of the present example.

FIG. 3 shows a very straightforward mapping of three columns of the product-details table to the three attributes (name, model and has-description) of the Product concept of the ontology. As in FIG. 2, the primary key column "pid" is not mapped to anything in the ontology since there is no corresponding attribute in the ontology of the present example to map it to. Similarly, there is no corresponding attribute in the ontology to which to map the "date" column, so this also remains unmapped.

FIG. 4 shows another mapping between a table and ontology concepts/attributes. Note that in this case the foreign key columns "p-id" and "c-id" are mapped to attributes in the ontology, since the Order concept has appropriate attributes, has-product and has-customer respectively, to which these may be mapped. Note that from the foreign keys the system is able to obtain the necessary product and customer information in order to provide the relevant details for the referenced product/customer if necessary. Also note that the cost column is mapped to the amount attribute of the ontology concept Price. There is no mapping between the currency-type attribute of the Price concept, since in this case this information is not stored explicitly in the relational database—rather it is implicit that the cost is in the currency of the country in which the company, whose database this is, operates—i.e. UK pounds sterling; this value is therefore filled in automatically by a transformation (i.e. in the mapping details table the column-name column entry for the respective row is empty but the concept name contains the concept Price and the "attribute" column contains the attribute currency-type and a transformation-id is placed in the "transformation-id" column which links via the transformation table to an expression which simply sets the currency type to UK pounds sterling for all entries from the order table.

The Fusion Algorithm

This section details the algorithms used to support the on-demand data fusion with real-time data quality.

Business users interact with the system through a Graphical User Interface (GUI). The interface includes a GUI representation of the semantic repository which contains all available data sources (i.e. the underlying data resources). Each data source is represented by an icon in the interface. Through right mouse-clicks on data sources, there are a number of things available to the business user to make the selection of appropriate data easier. The business user can view the data source contents through its business view, ie. the contents are described by an ontology (this is described in greater detail below); examine their metadata such as their owners and context data as given in the data-source-metadata and context data tables; view data quality profiles such as accuracy of columns and missing values; and view actual data source contents (i.e. view the actual schema or other native data description provided by the underlying data resource).

After examining these, the business user can drag and drop appropriate data sources to the selected data source pane. The integrated business view will be automatically updated when data sources in the selected data source pane change. The business users can unselect any data source in the selected data source pane if they see a better replacement data source in the semantic repository.

The integrated business view is a unified view of all the data sources in the selected data source pane. Thus it acts as a virtual data warehouse. Users or applications can query the selected data sources through the unified view. The system will automatically retrieve any relevant data from individual data sources and fuse the results and present the final results in terms of the unified business view to the users or the applications.

Business View for Individual Data Sources

The business view of an individual data source is computed by its associated ontology and the mappings in the Mapping database and/or in individual wrappers.

The system computes the business view by pruning its associated ontology—by removing concepts and nodes from the full ontology based on mappings available in the mapping tables.

The following logic is used in the present embodiment to perform the pruning of the ontology:

call the MappingDB getMappings function to get a vector of 2 vectors, one for the concept names and other for the attribute names for which mapping from the data sources to the ontology exists.
Get handle 'onts' to vector of concept names
Get handle 'atts' to vector of attribute names
Obtain an iterator 'classes' to the OntClasses in the Ont-Model
Convert iterator into vector 'clists' of OntClass
Get an enumerator for the vector 'ccc' of OntClass
For each OntClass object in 'ccc' call keepNodes(ontClass, onts, atts, dels) to remove unmapped attributes from concept and add the unmapped concepts (i.e. concepts where no attributes or subclasses are mapped to selected datasources) to dais vector;
Removed all unmapped concepts from Model by iterating through the dels vector.

KeepNodes

This function would behave as following when given a particular concept, list of concepts from mappingDB, list of attributes from mappingDB and a vector delS (to hold the concept in-case it needs to be deleted)
1. returns true when at least 1 property of the concept is present in the list of attributes
2. returns false for a concept when NO properties, of the concept or its subclasses, are present in the list of attributes
3. when the function returns false, the concept is added to dels vector (for deletion later)
4. when the function returns true
i. all attributes of the concept that were not available in the attribute list are removed from the concept
ii. any superclasses of the concept not initially available in the list of concepts are added to the list of concepts

```
if (kNodes.contains(c)) {
    return true;
}
```

Logic as follows:
for the concept (also known as class) determine the property list (also known as attribute list)
for each attribute of concept
    if attribute exists in attribute list, set flag to true
    if attribute does not exists in attribute list, delete attribute from model
if flag is true (i.e. the concept has mapped attributes)
    a determine the list of superclasses of the concept
    for each superclass
        add superclass to list of concepts (vector) if it is also not present
        return true
Note: the following part is executed only when the flag is set to false because the
    function would have returned true if the flag were set to true
    determine the list of subclasses of the concept
    for each subclass
        make a callback to keepNodes to determine if either the subclass or any of the subclasses of the subclass has a mapped attribute (recursive call till the leaf level class is reached)

if keepNodes returns true, set flag to true and break (i.e. break recursive call when the first mapped attribute for a subclass is found)
if flag is true return true,
else if list of concepts to be deleted does not contain this concept
add to list
return false Integrated Business View of all Selected Data Sources The unified business view of all selected data sources is computed according to an algorithm similar to the above algorithm for a single data source. The only difference is that instead of examining one data source mapping, it will look through all mappings of the selected data sources.

Processing Queries Over the Integrated Business View

The query composition in ontology is very similar to SQL on relations. We treat Concepts roughly like tables and the typed relation as a'Foreign key relationship. The following are some example query types.

Customer
    name
    address
    product: Product
Product
    name
    model
    description A query is then like: customer.name, customer.address, product.name, product.model from Product and Customer where customer.name="Dave Brown"

The results of this query will be denormalised. In this query, we are looking at the relationship between Customer and Product.

A simple query could be: customer.name, customer.address from Customer.

We could have an Order concept as follows:
Order:
    pname
    cname
    date

A query could be like this:
Customer.name, product.name, date from Customer, Product and Order When a query is composed by the users through highlighting nodes and attributes of the integrated business view and through filling in certain attribute values, it's translated into the form discussed above.

Upon receiving a query, the system first computes all the concepts and all attributes appearing in the query. These are then used to search the mapping database for mappings which map these concepts and attributes to the data sources present in the selected data source pane. This produces a list of data sources relevant to the query.

The concepts and attributes of the query are then partitioned into sets. Each set corresponds to one data source. All concepts and attributes in each set can be answered by the data source associated with the set.

After that the query is decomposed into sub-queries. Each sub-query can be answered by at least one data source. There are cases where more than one data source could answer a sub-query.

The answers from each sub-query are then fused to provide the final answer to the original query.

EXAMPLES OF THE FUSION ALGORITHM IN ACTION

To provide a better understanding of the above set out algorithm, various examples of the algorithm in operation are set out below.

Example 1

Processing a Query Using Only One Data Source

Query: select Customer.name, Customer.Telephone.has-area-code from Customer

FIG. 2 illustrates mapping details required to answer this query. Note that when expressing a query using terms from the ontology, sub-concepts and attributes of concepts are specified using a dot notation which will be familiar to readers used to the notation employed in many object oriented programming languages such as Java—i.e. Customer.Telephone.has-area-code means the has-area-attribute of the Telephone sub-concept of the Customer concept. Since no specific values have been mentioned this query should obtain the customer name and telephone area code of every record in the customer table.

This query can be answered from the single database table illustrated in FIG. 2. There are two mappings relevant to the query. For the customer name, it's straightforward to retrieve from the table through the name mapping. For the "has-area-code" attribute, this uses the mapping from column "telephone", of the Customer-details table, to the has-area-code attribute of the ontology concept Telephone, in combination with any transformation expression required to obtain the desired area code from the telephone number stored in the table.

After examining the two mappings, we know the query can be answered from one data source. Furthermore the two relevant mappings map to a single table. This means that this query can be answered from one table. As the Customer.name and Customer.Telephone.has-area-code are mapped to one table, the answers for each pair of Customer.name and Customer.Telephone.has-area-code have to correspond to each record. To understand this, we must understand that from the algorithm point of view, the two values from the two mappings have to be joined together. As the two values from the same table, they must correspond to the original association. If a customer A has telephone number 605682 and the mapping fills in the area code 01473, then the area-code for customer A has to be 01473. If a customer B has telephone number 605682 and the mapping fills in the area-code 01206, then B Must have area-code 01206. Any other joins would be invalid.

If mappings map concepts and attributes to one single database table, each record retrieved must be from a single record from the table.

Example 2

Processing a Query Using More than One Data Sources

Let's assume the query is the same above Example 1 but that now there are two selected data resources both of which contain a table which could answer the query.

The processing is similar to the algorithm outlined in Example 1. However, this time any duplicate records will be removed. In case there are conflicting records, the system would choose a record according to the data source quality. The table having a better data quality profile would take priority. When the data quality profiles are the same, an arbitrary one will be returned. In any case, the final results will be highlighted to signal that the system has made a selection and detailing what that selection was.

Example 3

Processing a Query Through Joins

Query: select Order.Product.name, Order.Customer.name, Order.Price.amount from Order FIG. 4 shows the mapping details relevant to the above query.

In this example we again assume that the tables exist in a single underlying data resource. Had there been multiple possible tables, etc, the conflict resolution would have been performed in the same way as described above with reference to Example 2.

Order.Product.name

From the Order concept, it is apparent that the has-product attribute is of type Product which is a concept in the ontology. The system therefore looks for a mapping to the Product concept in the Mapping Database (or in the wrapper). If the system can not find any mappings to the Product concept, then the query returns null results.

If it finds a Product mapping, but (as in the present case) finds that Product is mapped to a different-table from that to which the Order concept is mapped—i.e. the concept Product is mapped to the Product-details table while the concept Order is mapped to the Order table), then since the Order.has-product attribute is mapped to p-id, the system assumes (correctly) that this field can be used to join with the table (i.e. the Product-details table) to which the concept Product is mapped. Thus, to summarise, if the system finds a foreign key relationship, the two tables are joined through this foreign key relationship. If the two tables have no directly linking foreign key relationships, the system will look through all tables in the same database, if it finds a foreign key relationship path, then the two tables will be joined through the path. If there are more than two paths, the system will choose one according to the rules given in a knowledge base if one exists (this may conveniently be stored as part of the Meta Database) or otherwise based on quality information about the quality of the various tables and or individual columns within the tables to be used in the joining.

The knowledge base, if present, contains the business rules which describe valid joins. The business rules are given by system administrators or automatically learned through text mining techniques. As this patent does not cover this aspect, the details are not given. But there are many text mining techniques which could be used for this purpose.

Join Through Implicit Keys

Figure 5:
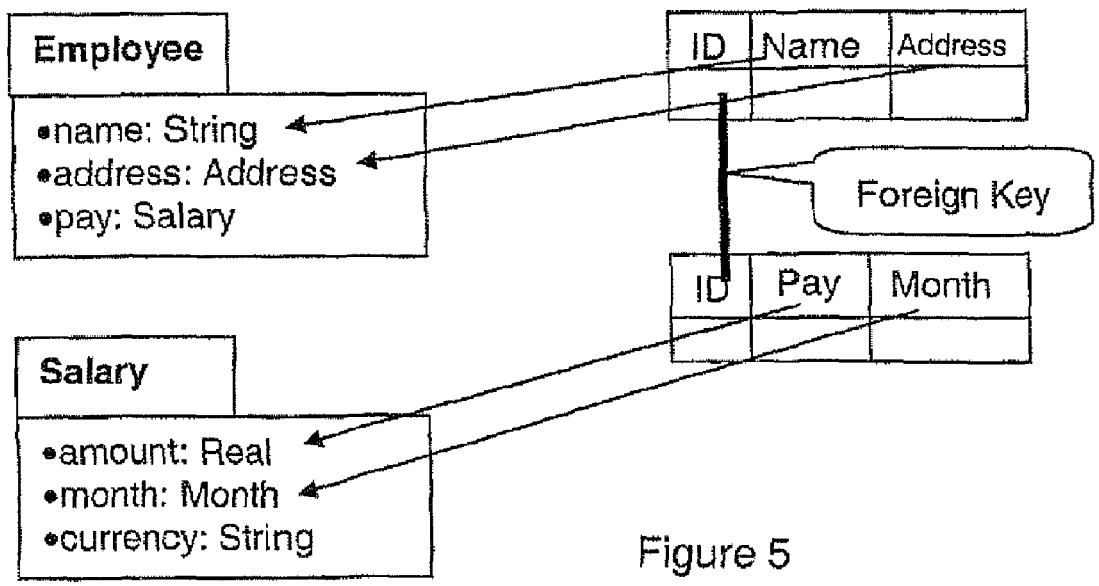
FIG. 5 is a schematic drawing illustrating how a foreign key connection between two tables in a data resource can be used to join the tables.

In the above examples, the keys are all explicitly mentioned through the mappings. There are cases where the necessary keys for performing joining are not explicitly referred to anywhere in the mappings. An example is shown in FIG. 5. The Employee concept is mapped to one table and the Salary concept is mapped to another. Then the following is a valid query.

Query: select Employee.name, Employee.Salary.month, Employee.Salary.amount from Employee and Salary As the query needs to join Employee and Salary and they have mapped to different tables, the system would look at how to join the two tables in the database. The order list for joining is as follows:
1. Foreign key relation between the two tables.
2. If there is not a direct foreign key and the two tables are from the same database, look for alternative or candidate keys for a direct join as declared in the database dictionary, if present.
3. if step 2 could not find any alternative or candidate keys, look at the knowledge base, if present, to see whether there is any join key information given there.
4. If step 3 fails, calculate an indirect transitive join path as outlined in the previous example.
5. If step 4 fails, the system will go through the semantic key step as outlined in the next section. The semantic key also applies to tables from different databases.

Note that the data base dictionary (sometimes also referred to as a data dictionary) is a data structure often provided in underlying data resources which may specify a large amount of information about the data contained in the resource, including information about how different tables may be joined together.

Semantic Key

The semantic key procedure is used to find semantic join keys when the system can not find any other ways to join two tables. When two tables are from two different databases, the system always goes through the semantic key process.

The order of semantic join key finding is as follows:
1. Search through the knowledge base for any joining information. If a key is found, use it to join the two tables.
2. If step 1 fails, examine the ontology. If the two tables each have an attribute or combination of attributes mapped to the same ontology concept attribute, then they will be used as a join key.
3. Otherwise it will compute attribute correspondences. Each correspondence will have a probability score. A weighted sum of the scores is used to determine whether two records should be joined or not. When the weighted sum is over a certain threshold, the two records will be joined.

Figure 6:
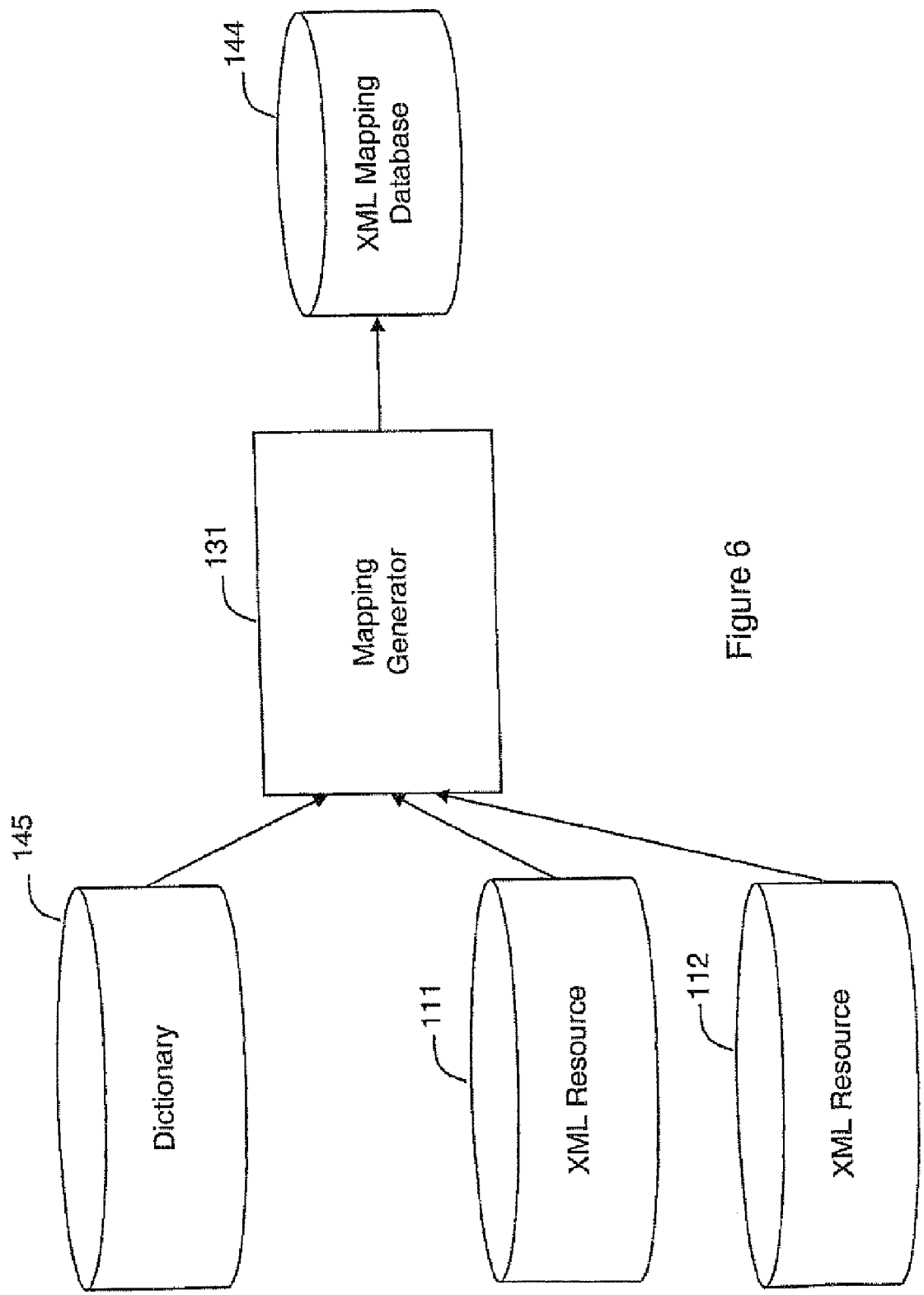
FIG. 6 is a block diagram of an arrangement for producing mappings between XML files and/or formats and an ontology.
Figure 7:
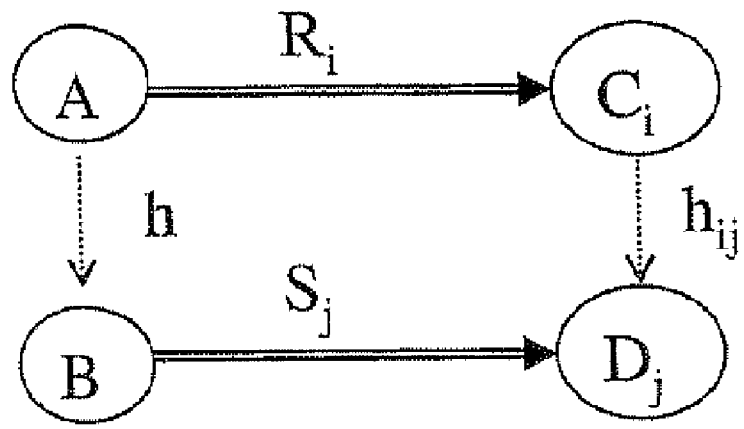
FIG. 7 represents the relationships between two sets of objects and their respective attributes referred to in Appendix 1.
Figure 8:
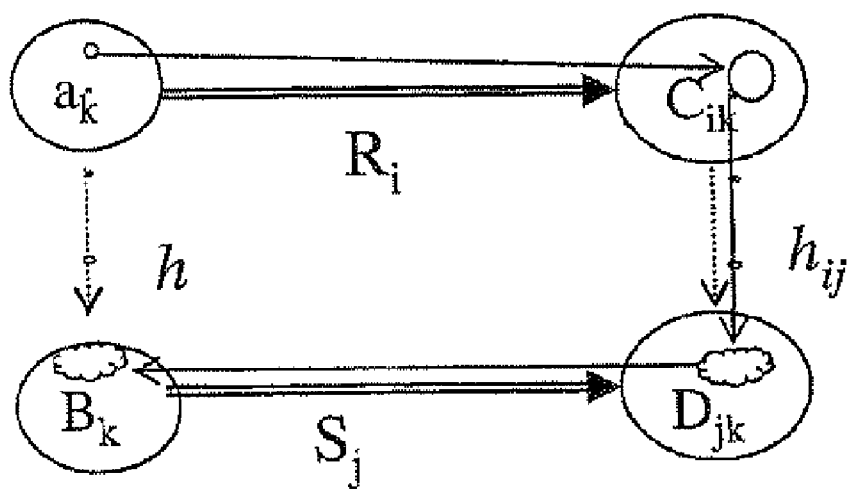
FIG. 8 represents relationships between elements and subsets of two co-domains referred to in Appendix 1.
Figure 9:
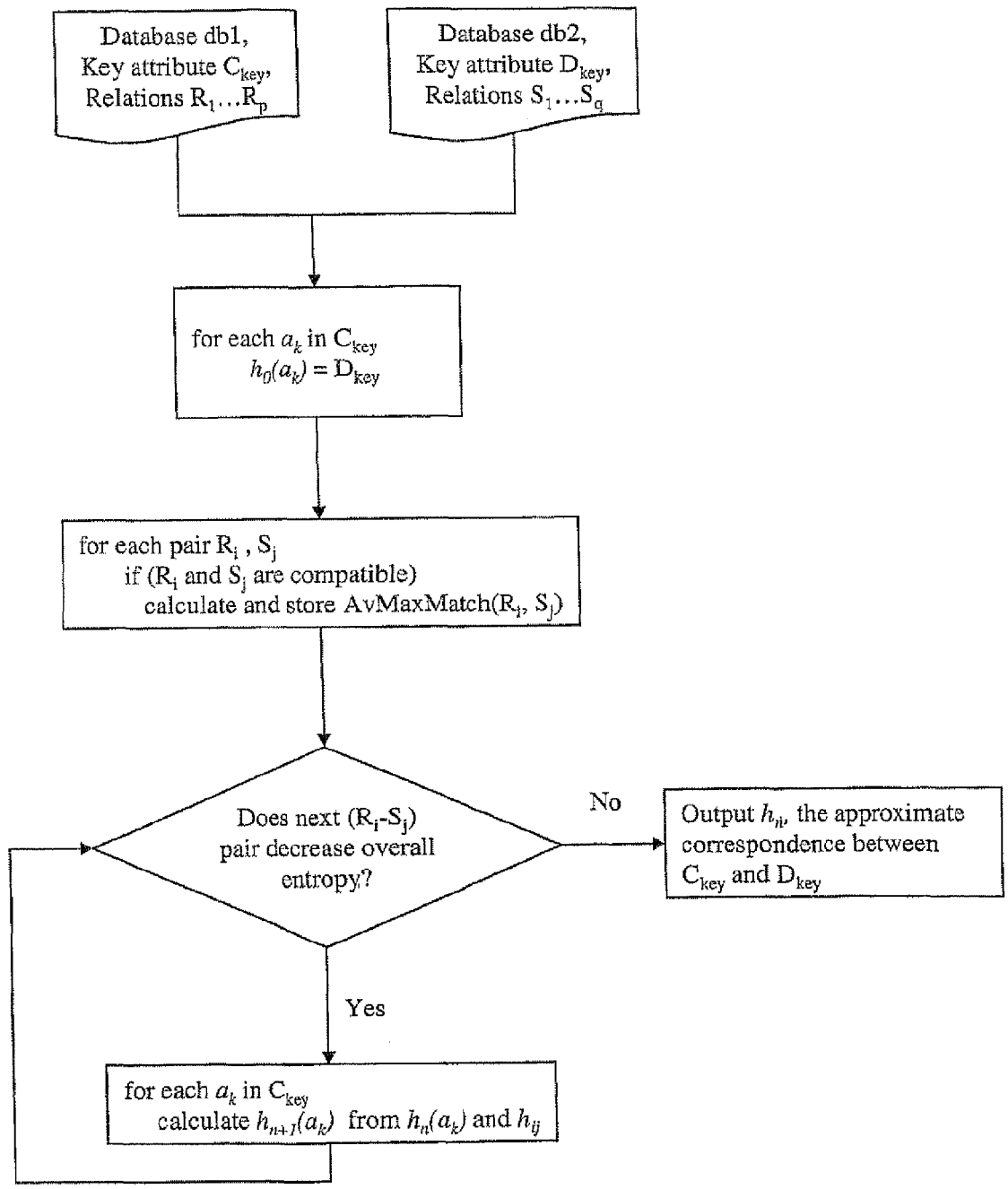
FIG. 9 shows the steps which may be carried out in implementing a method described in Appendix 1.

The details of the algorithm associated with step 3 are set out in co-pending International published patent application WO 2006/103398 a copy of which is appended hereto as appendix 1, omitting the background and claims sections, the second appendix and the final figure, whilst renumbering FIGS. 1-3 as new FIGS. 7-9 appended to FIGS. 1-6 of the present description. However, for ease of understanding, an example of how this technique could be applied to some example data is given below.

The following examples illustrate the three above described ways of forming a semantic join between tables in separate databases:

Consider a table, Customer details, stored in a database 1 of a daughter company, A, forming part of a group of companies A-D, having entries:

| c-id | Name | address | telephone | Pid |
|------|------|---------|-----------|-----|
| 1001 | Andrew Brown | 10 Aardvark St. LONDON SW1 2AB | 020 1234 5566 | AB 01 |
| 1002 | Christopher Deakin | 20 Bear St. LONDON SE2 3CD | 020 5678 1122 | DE 02 |
| 1003 | Edward Finn | 30 Crow St. LONDON NW3 4EF | 020 3456 4455 | GH 03 | and a table, Complaints, in a database 2 of the parent company, P, of the daughter companies A-D, having entries:

| Ref. No. | Company | Client | Product | Date | Notes |
|---|---|---|---|---|---|
| C1000 | A | 1002 | DE 02 | Jan. 10, 2007 | Resolved. |
| C1001 | A | 1005 | DE 02 | Mar. 10, 2007 | Comment passed to Customer Services. |
| C1002 | C | 1002 | X5 | Apr. 10, 2007 | Resolved. |

The knowledge base could contain the information that in order to join the Customer details table stored in a database 1 of daughter company A with the Complaints table of database 2 of the parent company, you disregard any entries in the latter table where company is not equal to A and then match the Client column entry in the latter table with the c-id column entry in the former table. This information can then be used to unambiguously join the two tables together.

For the second step of the semantic join process (which is performed if there is no explicit joining information provided in the knowledge base, i.e. "If step 1 fails, examine the ontology. If the two tables each have an attribute mapped to the same ontology concept attribute, then they will be used as a join key.") consider a case where the knowledge base does not include the explicit joining information discussed above, but instead the ontology concept Customer includes an attribute has-account: Account which itself is a concept having two attributes: company: Company (which is also a concept in the ontology in its own right) and Account No: integer. The Account No. attribute could be mapped to the c-id column of the Customer details table of database 1 of daughter company A, with a transformation mapping rule mapping the company attribute to company A, while with respect to the Complaints table of the parent company's database, the Account No. attribute could be mapped to the Client column and the company attribute could be mapped to the Company column. From this information in the mapping tables, it is clear that the has-account attribute can be used to join the tables in the same way as before when using explicit join information provided in the knowledge base.

If both of these steps are unable to join the tables, then the process described in the appendix can be used. In this case, a number of matching functions, which produce one or more results in terms of possible objects of a target table for a given input object of a starting table, are used to generate a mechanism for matching, in many cases, an object of the starting table to the corresponding one in the target table. In a simple case, the matching functions, and the order in which they are to be applied by the system, can be provided by the user of the system, alternatively, the automated methods described in the appendix can be used. As an example, a first matching function for combining the two above tables could be to find objects (i.e. rows) for which the first column (i.e. the c-id column) of the Customer details table matches the third column (i.e. the Client column) of the Complaints table. In the above example table entries this matching function would result in two possible selections for the second row of the Customer details table (c-id 1001 matches rows 1 and 3 of the Complaints table). A second matching function of matching entries in the fifth column (the pid column) of the Customer details table with entries in the fourth column (Product column) of the Complaints table results in rows 1 and 2 being returned as matches. If low (or zero) probabilities are given to non-matching rows from the two matching functions then both rows 2 and 3 are ruled out and only (the correct) row 1 of the Complaints table is matched to row 2 of the Customer Details table.

Fusing Sub-Query Results

Where a large query has been split by the processing unit into a plurality of separate subqueries (often to go to different underlying data resources) the sub-query results all carry information of the corresponding data resource and data table names. The join keys for joining these sub-query results are calculated through the semantic key process as outlined above.

Dealing with XML Repositories

The present embodiment includes a few features which are specific to dealing with underlying data resources which are comprised of XML repositories and these will now be discussed with reference to FIG. 6.

The over-riding principle of operation is the same, however it is advantageous to provide a few additional functionalities for dealing with XML repositories specifically. One such functionality is the ability to use XQuery as the querying language instead of an SQL type query language, since XQuery provides richer features for use with XML repositories as well as being applicable to relational databases.

Furthermore, the mappings between an ontology and XML schema (or similar), in the present embodiment, map between ontology concepts and/or attributes and XML element and/or attribute names. The manner in which he mappings are generated in the present embodiment is described below with reference to FIG. 6. A Dictionary store 145 stores a dictionary which is maintained by an administrator or business user. The dictionary store may conveniently be formed as part of the Mapping Database 44. The Dictionary store 145 specifies any words which appear in the XML documents of the underlying data resources which are the names of XML elements or attributes which map across to a corresponding concept or attribute of the ontology. Whenever the dictionary is updated, the user/administrator has the option to regenerate a mapping in respect of any of the underlying data resources which are XML repositories. When this is done, the dictionary is processed by the Mapping generator 131 together with an XML schema provided by the selected underlying XML resource (111 or 112). From this information the dictionary is compared with the XML schema and a mapping is generated which is specific to the respective underlying resource and this is stored in an XML Mapping Database 144 (which may conveniently form part of the Mapping Database 44).

In the present embodiment the dictionary is provided using a simple language with a construct such as:

word→[list of words that each conveys the semantically equivalent meaning]

as an example consider the following dictionary, a *.map file:
    title→[titre]
    surname→[lastName, nom]
    DateOfBirth→[DateDeNaissance]
    maritalStatus→[etatCivil]
    firstname→[forename, christianName, prenom]
    city→[town, ville]

The syntax of which can be defined in following manner:

$$T \rightarrow (E)^*$$

$$E \rightarrow V'' \rightarrow ''S$$

$$V \rightarrow \langle ID \rangle$$

$$S \rightarrow [\delta(,\delta)^*]$$

$$\delta \rightarrow \langle ID \rangle$$

Which, as a reader familiar with this notation will appreciate means that the dictionary or Thesaurus (T) comprises one or more statements or Elements (E), each of which takes the form of a first thing (V) followed by an arrow which in turn is followed by a second thing (S). The first thing (V) comprises exactly one string value (<ID>) while the second thing (S) comprises one or more sub-things (δ) each of which is separated by a comma and each of which comprises a single string (<ID>).

In the present embodiment this is displayed to the user as a tree like structure such as that provided by the JTree GUI component in Java. The user can amend the dictionary using the GUI by selecting to add an additional node to the dictionary in the appropriate place (i.e. so as to be a sub-node of a main node corresponding to the appropriate concept or attribute of the ontology.

The system also enables the user to access an individual mapping table directly in case a complex transformation is required for a successful mapping, in which case the user can enter this directly into the mapping table/transformation table.

Once the mapping is available, it is straightforward for the wrapper to either translate XQuery queries to into a form appropriate for querying the XML repository directly (to obtain an answer to a single query). Alternatively, the wrapper can generate translated XML schema's corresponding to the XML schemes of the underlying resource and these can be used by the processor 30 to generate the integrated business view of the underlying resources, etc.

APPENDIX 1

Database Management

Technical Field

The present invention relates to database management methods and systems, and more specifically to methods of operating a database management system for integrating data from a plurality of data sources.

Summary of the Invention

According to the present invention, there is provided a method of operating a database management system for integrating data from a plurality of data sources, said data sources being at least partially structured and comprising data objects each comprising data relating to one or more attributes of an entity; said method comprising steps of:

(a) selecting, for each of a first and a second data source, an initial attribute or combination of attributes;
(b) automatically selecting, in respect of said attributes or combinations of attributes of said first and second data sources, a candidate matching function from a set of possible matching functions, said matching functions relating to possible mappings between data relating to one or more attributes in said first data source and data relating to one or more attributes in said second data source;
(c) applying said candidate matching function to data relating to said selected attribute or combination of attributes in said first data source to create possible data relating to said selected attribute or combination of attributes in said second data source;
(d) deriving, from said possible data and from actual data in said second data source a disparity measure relating to an amount of disparity therebetween;
(e) automatically selecting one or more different candidate matching functions from said set of possible matching functions, and repeating steps (c) and (d) in respect thereof;
(f) establishing, from said candidate matching functions, a candidate matching function having a disparity measure indicative of the lowest amount of disparity, and designating said candidate matching function as a probable candidate matching function;
(g) selecting, for each of said first and second data sources, one or more further attributes or combinations of attributes, and performing steps (b) to (f) in respect thereof whereby to establish probable candidate matching functions in respect thereof; and
(h) determining, with reference to one or more of said established probable candidate matching functions, a probable correspondence between data objects of said first data source and data objects of said second data source.

Also according to the present invention, here is provided a database management system for integrating data from a plurality of data sources, said data sources being at least partially structured and comprising data objects each comprising data relating to one or more attributes of an entity; said system comprising:

(a) means for selecting, for each of a first and a second data source, an initial attribute or combination of attributes;
(b) means for automatically selecting, in respect of selected attributes or combinations of attributes of said first and second data sources, a candidate matching function from a set of possible matching functions, said matching functions relating to possible mappings between data relating to one or more attributes in said first data source and data relating to one or more attributes in said second data source;
(c) means for applying a selected candidate matching function to data relating to said selected attribute or combination of attributes in said first data source to create possible data relating to said selected attribute or combination of attributes in said second data source;
(d) means for deriving, from said possible data and from actual data in said second data source a disparity measure relating to an amount of disparity therebetween;
(e) means for automatically selecting one or more different candidate matching functions from said set of possible matching functions, and arranging for the or each of said different candidate matching functions to be treated by means (c) and (d);
(f) means for establishing, from said candidate matching functions, a candidate matching function having a disparity measure indicative of the lowest amount of disparity, and designating said candidate matching function as a probable candidate matching function;
(g) means for selecting, for each of said first and second data sources, one or more further attributes or combinations of attributes, and arranging for the or each of said further attributes or combinations of attributes to be treated by means (b) to (f) whereby to establish probable candidate matching functions in respect thereof; and
(h) means for determining, with reference to one or more of said established probable candidate matching functions, a probable correspondence between data objects of said first data source and data objects of said second data source.

Embodiments of the invention to be described below use an approach based on record matching, which does not rely on or necessarily assume any knowledge of the schema, i.e. it is not necessary for a user to specify which attributes match. A library of matching functions may instead be used to find possible correspondences between attributes from different data sources. These matching functions can be pre-programmed, or may be created by a machine learning system. Possible matching attributes (with associated matching functions) are ranked by a measure of fuzzy specificity and the probability of matches between the attributes.

According to preferred embodiments of the invention, each of the steps of the above method may be carried out automatically, such that the method may be said to be fully computer-implemented. It is foreseeable, however, that certain other embodiments of the invention may allow for one or more steps, such as the step of selecting the initial attribute for one or both of the data sources, to be carried out "manually" (i.e. by a human user, for example). Such embodiments could be said to be partially computer-implemented.

Preferred embodiments of the invention use a soft computing method, combining fuzzy and Bayesian techniques, to represent and update the correspondences between two data sources. Updating may be an iterative process, using the ranked list of attributes pairs and matching functions. The process may be stopped by monitoring the fuzzy entropy of the mapping from one data source to the second.

An important feature of preferred embodiments of the invention is the way they may combine "partial matches" between attributes from different sources in order to generate an estimate of the match between objects in those sources. For each object in the first source, a fuzzy set of possible matches may be found in the second source. This may be achieved using an algorithm which first considers possible matchings between attribute values and establishes a ranking order for these mappings. The mappings are likely or expected to be uncertain so that an attribute value may map to a fuzzy set of possible attribute values. This is not necessarily symmetric. The best mappings are selected for the next stage. In the second stage, for each attribute mapping selected, the matching for an object may be updated on the basis of the fuzzy probability of the new attribute mapping for that object, given what has already been established.

Using embodiments of the invention two structured or semi-structured data sources may be integrated. The data may be stored in databases or non-database sources (XML, web, semi-structured repositories, etc) or even as free text in a document base. It is frequently necessary to make use of more than one source in carrying out a task (e.g. answering a query, compiling a report, carrying out an electronic transaction, comparing products from different sources, etc).

The classification structure and attributes (properties) of the objects (i.e. the values associated with meta-data tags) can be used to guide the integration of information. Even if different hierarchies use different categories, there is likely to be a degree of correspondence, and objects placed within similar categories are likely to have similar properties. For example, the automotive industry and chemical industry have separately agreed standards for electronic data exchange (www.starstandard.org, www.cidx.org) which are almost identical in some categories, overlap in some and are disjoint in others. However it is perfectly possible that a third party might wish to merge information formatted according to the two different standards. Similarly, a digital library and an online bookseller refer to the same (structured) objects but may differ in categorisation and details stored about each book.

In the absence of a centrally agreed standard, it is rare for two sources to adhere to precisely the same conventions. Even where agreed conventions exist, interpretations may differ—for example, consider an electronic order for goods with a tag "shippingDate". It may not be clear whether "shippingDate" refers to the time when goods are delivered to the customer or the time when they leave the supplier. Additional problems may arise from subtle differences in the information stored—for example, a classified directory may list phone numbers as <area-code><local-numbers> whereas another might just list the <local-number>. A person may be listed as <surname>, <initials> or as <forename><surname>. Thus even when the information from different sources is identical, a straightforward syntactic match might not reveal this.

In describing a preferred embodiment of the invention below, we will consider two information sources referring to discrete sets of objects, with associated properties (attributes). The properties can be used to group the objects into classes, which may in turn form some sort of hierarchical structure. For example, documents in a digital library or online bookshop may have some or all of the properties such as author, publication date, title, publication format, ISBN, publisher, etc. Restaurants in a classified directory might have a name, address, telephone number, as well as an optional brief description and other properties such as location, menu details, etc. Entries in product catalogues might have names, part numbers, prices, categories and short descriptions. These are all examples of structured objects that refer to real-world entities.

Given two sources which are known (or assumed) to refer to approximately the same sets of real world entities, the information fusion task may be thought of as how to determine whether an object from a first source or database, which we will term obi, refers to the same real-world entity as an object from a second source or database db2, and to determine how the properties correspond (e.g. author and composer may correspond almost exactly to creator; business-name should correspond to company-name, etc).

Preferred embodiments of the invention use a fuzzy updating technique to find an approximate mapping between two sets of objects, given possible mappings between some of their properties. An iterative process may be used, in which the possible mappings between properties are chosen according to the strength of the correspondence between the properties. A new measure of fuzzy entropy may be used to halt the process.

In order to outline an embodiment of the invention below, we will consider a situation in which there are:
 two structured or semi-structured information sources db1 and db2, which are sets of objects referring to approximately the same sets of items in the real world. The objects have attributes (properties).
 candidate procedures for identifying similarity or identity between attribute values.

For each object in db1, an estimate of the corresponding object in db2 is produced. Preferably, this estimate is a fuzzy subset of objects in db2. This fuzzy set can be converted to a probability distribution if required.

The approach is based on the "Identity of Indiscernibles", proposed by Leibniz, which can be summarised as follows: If we cannot tell ("discern") two objects from each other, then they are the same object. Here, we can only tell two objects apart on the basis of their attribute values. Let us assume that sources db1 and db2 have the same sets of attributes. Then, if an object from db1 has identical attribute values to an object from db2, we must conclude that they refer to the same real-world entity. If the attributes differ but the sets of possible attribute values can be related in some way, then we can find an approximation to the true mapping from db1 to db2.

For example in tables 1 and 2 below, each row corresponds to an object which is uniquely identified by the first attribute ("Employee-ID" in source db1 shown in Table 1, "Name" in source db2 shown in Table 2). We use a tabular representation for clarity, but we could equally well use XML, ROF or some other representation of semi-structured data.

TABLE 2

Data Source "db2"

| Name | Date of Birth | Occupation |
|---|---|---|
| Bill | 24-02-60 | Programmer |
| Bob | 11-11-51 | Sales Rep |
| Ben | 24-02-60 | Manager |
| etc | etc | etc |

TABLE 1

Data Source "db1"

| Employee-ID | D-O-B | Job title |
|---|---|---|
| 1407 | 16-Jul-71 | Software Engineer |
| 1213 | 24-Feb-60 | Software Engineer |
| 8100 | 05-May-73 | Consultant |
| etc | etc | etc |

In order to establish a correspondence between these two sources db1 and db2, it will first be noticed that "D-O-B" in db1 maps in an obvious way to "Date of Birth" in db2 with a simple translation of the format. Some entries under "Job title" in db1 correspond roughly to those under "Occupation" in db2—for example, "Software Engineer" is approximately equivalent to "Programmer".

These mappings can be found by examining the entire sets of values for an attribute in db1 and an attribute in db2, and looking for exact or approximate functions from the db1 attribute values to the db2 attribute values either by using pre-programmed procedures or by learning. More accurate mappings are preferred when determining the possible equivalences between objects, and a novel method of determining the accuracy of a mapping is given below.

Initially we make the assumption that each object in db1 corresponds to a fuzzy set containing all objects in db2—for example the object with employee-ID=1213 corresponds to {Bill/1, Bob/1, Ben/1, ...} where the notation e/m represents an element e with membership m. The set above represents a state of maximum uncertainty; this can be quantified by a fuzzy entropy-like measure.

Taking into account the fact that "D-O-B" in db1 corresponds to "Date of Birth" in db2 changes the set corresponding to employee-ID=1213 to {Bill/1, Ben/1} (assuming no other objects match on the D-O-B attribute). Clearly this set is less uncertain than before. Adding the information that Software Engineer is approximately equivalent to Programmer changes the set to {Bill/x} where x is related to the degree of equivalence between Software Engineer and Programmer. A similar approach derives an approximate correspondence for each element in db1. if there is evidence that an object in db1 does not correspond to anything in db2, the set would be empty; if there is no evidence then the set would remain as the whole of db2.

Preferred embodiments of the invention use possible pairs of attributes in order of accuracy until the overall uncertainty is minimised. Such embodiments may be made robust against missing information, noisy or erroneous data, and incomplete overlap between the sets of real-world entities referred to by db1 and db2.

BRIEF DESCRIPTION OF THE DRAWINGS

FIG. 7 represents the relationships between two sets of objects and their respective attributes;

FIG. 8 represents relationships between elements and subsets of two co-domains; and FIG. 9 shows the steps which may be carried out in implementing an embodiment of the present invention.

DESCRIPTION OF THE EMBODIMENTS

With reference to FIG. 7, assume we have two sets of objects $$A=\{a_1 \ldots a_n\}; \text{ and}$$

$$B=\{b_1 \ldots b_m\},$$

from data sources db1 and db2 respectively, and that we wish to establish an approximate mapping h from A to B. The data sources db1 and db2 may be in separate databases, but it will be noted that they may be from the same database. In order to establish a correspondence between the elements of A and B, we examine the properties (attributes) of the elements.

Let the objects in A and B have attributes $C_1$, $C_2$, $D_1$, $D_2$, ... with relations defined as:

$$R_i: A \to C_i \; i=1 \ldots nA$$

$$S_j: B \to D_j \; j=1 \ldots nB$$

Note that these are relations, i.e. they can be single- or multi-valued. Examples would be height, weight, nationality, name, passport number, phone number(s) etc.

We do not assume that the information about A and B in relations $R_i$, $S_j$ is identical or completely consistent, but we do assume that some of these relations reflect similar or identical properties of the objects in A and B. Thus for some choices of pairs of co-domains ($C_i$, $D_j$) we assume an exact or approximate matching function $h_{ij}$ which for each element of C returns a (possibly fuzzy) subset of D. This can be converted to a mass assignment giving a numerical estimate of the probability that the element corresponding to some $c \in C_i$ lies in a subset $\{d_1 \ldots d_k\} \subseteq D_j$. (We will refer to $h_{ij}$ as a function even though its output is not a single value.)

The $h_{ij}$ can be obvious mappings from co-domain to co-domain, involving exact matches or small permutations, truncations, etc; alternatively they can be more sophisticated functions, possibly the output of a machine learning process. The proportion of a domain that matches gives an indication of the overlap between domains and hence the possibility that two attributes correspond.

How do we Derive h?

This is obvious if the functions $h_{ij}$ are exactly known—for each element $a_k$ in A, $$h(a_k)=S_j^{-1}(h_{ij}(R_i(a_k)))$$

Example 1

To illustrate, we will consider a first example using a set of authors identified by author-id (A) and the one-to-many relations:

$R_1$ (author-id→name)

| author-id | name |
|---|---|
| author-1 | C. L. Dodgson |
| author-1 | Lewis Carroll |
| author-2 | H. G. Wells |
| author-3 | I. M. Copi |
| author-4 | Michael Coren |

$R_2$ (author-id→book title)

| author-id | book title |
|---|---|
| author-1 | Symbolic Logic |
| author-1 | Alice in Wonderland |
| author-2 | The Invisible Man |
| author-3 | Symbolic Logic |
| author-4 | The Invisible Man |

$R_3$ (author-id→date-of-birth)

| author-id | date-of-birth |
|---|---|
| author-1 | 27 Jan. 1832 |
| author-2 | 21 Sep. 1866 |
| author-5 | 30 Dec. 1865 | and (from another source) a set of writers identified by real name (B) with one-to-many relations:
$S_1$ (writer-real-name→ISBN)

| writer (real name) | ISBN |
|---|---|
| C. L. Dodgson | 0486204928 |
| C. L. Dodgson | 0091737648 |
| C. L. Dodgson | 0573150060 |
| H. G. Wells | 0809596369 |
| H. G. Wells | 0785731547 |
| I. M. Copi | 0023249803 |
| M. Coren | 0747511586 |

$S_2$ (writer-real-name→pseudonym)

| writer (real name) | pseudonym |
|---|---|
| C. L. Dodgson | Lewis Carroll |
| H. G. Wells | Walker Glockenhammer |
| H. G. Wells | Septimus Browne |

$S_3$ (writer-real-name→year-of-birth)

| writer (real name) | year-of-birth |
|---|---|
| C. L. Dodgson | 1832 |
| H. G. Wells | 1866 |
| A C Doyle | 1859 |
| J R Kipling | 1865 |

We assume there is a function $h_{21}$ which will return the set of ISBNs corresponding to a particular title:

$h_{21}$

| BOOK TITLE | ISBN |
|---|---|
| Alice in Wonderland | 0091737648 |
|  | 0573150060 |
| The Invisible Man | 0809596369 |
|  | 0785731547 |
|  | 0747511586 |
| Symbolic Logic | 0486204928 |
|  | 0023249803 | and the obvious function $h_{33}$ which matches date-of-birth with year-of-birth.

In order to link author-2 from set A to an author name from set B, we could look for the set of book titles written by that author using $R_1$, find the corresponding ISBNs using $h_{21}$ and then work backwards to writer(real name) via $S_1$. Thus:

$R_1(author_2) = \{The\ Invisible\ Man\}$ $h_{21}(R_1(author_2)) = \{0809596369, 0785731547, 0747511586\}$ $S_2^{-1}(h_{21}(R_1(author_2))) = \{H.\ G.\ Wells, M.\ Coren\}$ Given complete and certain information, we can choose additional pairs of attributes to refine this mapping. Taking the obvious mapping $h_{33}$ from date-of-birth to year-of-birth would give a second piece of evidence:

$S_3^{-1}(h_{33}(R_3(author_2))) = \{H.\ G.\ Wells\}$ so that we could conclude that author-2 in set A corresponds to H. G. Wells in set B. In general, we have to allow for the fact that $h_{ij}$ are approximate, and may be inconsistent. For example, year of birth might be missing, inaccurate or not known for sure ("born in the mid 1860's"). Taking the crisp information in the example above and allowing flexibility in the match function $h_{33}$ could give:

$S_3^{-1}(h_{33}(R_3(author_5))) = \{W.\ G.\ Wells/\mu_1, J.\ R.\ Kipling/\mu_2, A.\ C.\ Doyle/\mu_3\}$ where the memberships $\mu_i$ reflect the degree of match between 30 Dec. 1865 and 1866, 1865, 1859 respectively.

We treat each selected $h_{ij}$ as an approximate piece of evidence or observation of the elements in B that possibly correspond to elements in A. Because the evidence is not certain, we cannot completely rule out (or rule in) any elements—all we can do is update the probability that an element in A corresponds to a given subset of elements in B.

To start with, the most general statement we can make for any element $a_k$ is that it corresponds to some element in B. i.e. (for all k)

$h(a_k) \in B : 1$ where: 1 indicates that $h(a_k) \in B$ has a probability of 1, or if we represent it as a mass assignment $h_0(a_k) = B : 1$ (note that incompleteness i.e. assignment of mass to the empty set means that $a_k$ corresponds to an element outside B). This is our initial (and uninformative) approximation to h.

With reference to FIG. 8, if we can establish a reasonably specific matching between two co-domains $C_i$ and $D_j$, we can use this to refine the current approximation to h, since if $R_1(a_k) = C_{ik}$ and $h_{ij}(C_{ik}) = D_{jk}$ and $S_j(B_k) = D_{jk}$ then $h(a_k) = B_k$ i.e. $a_k$ corresponds to an element x in the subset $B_k$ with some probability given by:

$$m_{ij}^k(x) = Pr(x \in S_j^{-1}(h_{ij}(R_i(a_k))))$$

Thus, given a possible match function $h_{ij}$ we update the probability that $$h(a_k) \in B_k$$

for each $B_k$, based on the "observed" values $h_i(a_k)$.

How should we combine the masses $m_{ij}$ from different i, j pairs? Consider a number of observations which are represented as mass assignments over some universe of possible values B.

Let $M_n$ be the mass assignment on B that makes the observed values most likely after n observations, i.e. choose the masses to maximise:

$$Pr(M_n | o_1, o_2, \ldots, o_n)$$

This gives a way of updating M after each observation.
Using a naive Bayes assumption:

$$Pr(M_n | o_1, o_2, \ldots, o_n) = \frac{Pr(o_1, o_2, \ldots, o_n | M_n) \times Pr(M_n)}{Pr(o_1, o_2, \ldots, o_n)}$$

$$Pr(o_1, o_2, \ldots, o_n | M_n) = Pr(o_1 | M_n) \times Pr(o_2 | M_n) \times \ldots \times Pr(o_n | M_n)$$

Assuming each possible mass assignment $M_n$ is equally likely, $$M_n(B_k) = \frac{N_n(B_k)}{\sum_{X \subseteq B} N_n(X)}$$

where $N_n(X)$ is number of times the subset X has been observed.

Each matching function may give a fuzzy set as its estimation of corresponding elements for each element $a_k$ in A, and for each chosen $h_{ij}$ the fuzzy set is given by $$S_j^{-1}(h_{ij}(R_i(a_k)))$$

To combine these estimations—in practice, we take the overall average of memberships in the fuzzy sets. The theoretical basis for this is from mass assignment theory and Bayes theorem.

Example 2

To further illustrate the above, we will consider a second more complex example. Consider a set of authors identified by author-id (A) and the relations:

$R_1$ (author-rd→name)

| author-id | name |
|---|---|
| author-1 | C. L. Dodgson |
| author-1 | Lewis Carroll |
| author-2 | H. G. Wells |
| author-3 | I. M. Copi |
| author-4 | Michael Coren |
| author-5 | Rudyard Kipling |
| author-6 | Sir Arthur Conan Doyle |
| author-7 | Stephen King |
| author-8 | Sir Walter Scott |
| author-9 | Beatrix Potter |

$R_2$ (author-id→book title)

| author-id | book title |
|---|---|
| author-1 | Symbolic Logic |
| author-1 | Alice in Wonderland |
| author-2 | The Invisible Man |
| author-3 | Symbolic Logic |
| author-4 | The Invisible Man |
| author-4 | The Life of Sir Arthur Conan Doyle |
| author-5 | Actions and Reactions |
| author-6 | Historia de la penumbra y lo Invisible |
| author-6 | J. Habakuk Jephson's Statement |
| author-7 | The Talisman |
| author-8 | The Talisman |
| author-9 | The Taylor of Gloucester |

$R_3$ (author-id→date-of-birth)

| author-id | date-of-birth |
|---|---|
| author-1 | 27 Jan. 1832 |
| author-2 | 21 Sep. 1866 |
| author-5 | 30 Dec. 1865 |
| author-6 | 22 May 1859 |
| author-7 | 21 Sep. 1947 |
| author-8 | ??? 1771 |
| author-9 | 28 Jul. 1866 |

$R_4$ (author-id→nationality)

| author-id | nationality |
|---|---|
| author-1 | UK |
| author-1 | UK |
| author-2 | UK |
| author-4 | UK |
| author-5 | UK | and (from another source) a set of writers identified by real name (B) with one-to-many relations:
$S_1$ (writer-real-name→ISBN)

| writer (real name) | ISBN |
|---|---|
| C. L. Dodgson | 0486204928 |
| C. L. Dodgson | 0091737648 |
| C. L. Dodgson | 0573150060 |
| H. G. Wells | 0809596369 |
| H. G. Wells | 0785731547 |
| I. M. Copi | 0023249803 |
| M. Coren | 0747511586 |
| A. I. Conan Doyle | 9561314592 |
| Stephen King | 0345444884 |
| Sir Walter Scott | 1592247709 |

$S_2$ (writer-real-name→pseudonym)

| writer (real name) | pseudonym |
|---|---|
| C. L. Dodgson | Lewis Carroll |
| H. G. Wells | Walker Glockenhammer |
| H. G. Wells | Septimus Browne |
| A I Conan Doyle | anonymous |

$S_3$ (writer-real-name→year-of-birth)

| writer (real name) | year-of-birth |
|---|---|
| C. L. Dodgson | 1832 |
| H. G. Wells | 1866 |
| A C Doyle | 1859 |
| J R Kipling | 1865 |
| M. Coren | 1959 |
| Sir Walter Scott | 1832 (deliberate noise - this is date of death. Correct value 1771) |
| Stephen King | 1947 |
| Beatrix Potter | 1866 |

$S_4$ (writer-real-name→place-of-birth)

| writer (real name) | place-of-birth |
|---|---|
| C. L. Dodgson | Daresbury |
| H. G. Wells | Bromley |
| A I Conan Doyle | Edinburgh |
| J R Kipling | Bombay |
| M. Coren | Essex |
| Sir Walter Scott | Edinburgh |
| Stephen King | Maine |

Again we assume there is a function $h_{21}$ which will return the set of ISBNs corresponding to a particular title:

$h_{21}$

| BOOK TITLE | ISBN |
|---|---|
| Alice in Wonderland | 0091737648 |
|  | 0573150060 |
| The Invisible Man | 0809596369 |
|  | 0785731547 |
|  | 0747511586 |
|  | 0394222520 |
| Historia de la penumbra y lo invisible | 9561314592 |
| Symbolic Logic | 0486204928 |
|  | 0023249803 |
| The Tailor of Gloucester | 0723205949 |
| The Talisman | 0345444884 |
|  | 1592247709 |

Note that there will be some uncertainty here because titles may not match properly (e.g. tailor/taylor of gloucester, "invisible man"/"Historia de la penumbra y lo invisible"). Thus books matching "invisible man" could be
{0809596369/1, 0785731547/1, 0747511586/1, 0394222520/1, 9561314592/0.2}

There is an obvious match between dates:

$h_{33}$ (For Example)

| date-of-birth | year-of-birth | μ |
|---|---|---|
| 21 Sep. 1866 | 1865 | 1 |
|  | 1866 | 0.9 |
|  | 1859 | 0.2 | and similarly for other dates.

Finally there is a link between place of birth and nationality:

| nationality | place-of-birth | μ |
|---|---|---|
| UK | Bromley | 1 |
| UK | Edinburgh | 1 |
| Indian | Bombay | 1 |
| UK | Bombay | 0.1 |
| US | Maine | 1 | etc.

In mass assignment terms, initially:
author-1={C. L. Dodgson, H. G. Wells, A C Doyle, J R Kipling, . . . }: 1
author-2={C. L. Dodgson, H. G. Wells, A C Doyle, J R Kipling, . . . }: 1
Evidence from using $h_{21}$
author-1={C. L. Dodgson, I. M. Copi}: 1
author-2={{H. O. Wells, M Coren}: 0.8,
  {H. G. Wells, M Coren, A C Doyle}: 0.2}
(or as fuzzy sets {C. L. Dodgson/1, I. M. Copi/1}
  {H. G. Wells/1, M Coren/1, A C Doyle/0.2})
Combined
author-1=(C. L. Dodgson, H. G. Wells, A C Doyle, J R Kipling, . . . ): 0.5
  {C. L. Dodgson, I. M. Copi}: 0.5)
author-2={{C. L. Dodgson, H. G. Wells, A C Doyle, J R Kipling, . . . }: 0.5
  {H. G. Wells, M Goren, A C Doyle}: 0.1,
  {H. G. Wells, M Coren}: 0.4}
(equivalently)
fuzzy set-1={C. L. Dodgson/1, I. M. Copi/1, H. G. Wells/0.5, A C Doyle/0.5, . . . }
fuzzy set-2={H. G. Wells/1, M Coren/1, A C Doyle/0.6, J R Kipling/0.5, . . . }
In this case the fuzzy set and mass assignment are equivalent and are shown for illustration; below, we simply use fuzzy sets:
Using $h_{33}$, fuzzy sets are:
author-1={C. L. Dodgson/1, Sir Walter Scott/1}
author-2={H. G. Wells/1, Beatrix Potter/1 J R Kipling/0.9, A C Doyle/0.2}
Combining:
author-1={C. L. Dodgson/1, I. M. Copi/0.66, Sir Walter Scott/0.66, A C Doyle/0.33, H. G. Wells/0.33, . . . }: 0.33
author-2={H. G. Wells/1 M Coren/0.66, Beatrix Potter/0.66, J R Kipling/0.6033, A C Doyie/0.466 . . . }
Note that these memberships are the average of all fuzzy estimations, i.e. the initial estimate, $h_{21}$ and $h_{33}$.
Using $h_{44}$
author-1={C. L. Dodgson/1 H. G. Wells/1, A I Conan Doyle/1, J R Kipling/0.1, Sir Walter Scott/1, . . . }
and similarly for author-2. Because this is very general, the entropy increases so it is rejected and we retain the estimates derived from $h_{21}$ and $h_{33}$.
Taking the highest membership as the best approximation we have:
author-1=C. L. Dodgson
author-2=H. G. Wells
as expected, and similarly for author-3, . . . etc.
Choice of Pairs $R_i$, $S_j$
Clearly it is not very useful to update with attribute domains ($R_i$, $S_j$) that hardly match each other. The possible pairs of attributes could be ordered according to the average maximum probability of matching, AvMaxMatch. This is defined as follows:

$$AvMaxMatch(h_{ij}) = \frac{\sum_{x \in C_i} \max_{y \in D_j}(Pr(y \in h_{ij}(x)))}{|C_i|}$$

However this is not necessarily helpful in choosing which attribute to use next if there is a large amount of uncertainty in the approximate mapping. For example, if $C_i = \{c_1, c_2\}$ $D_j = \{d_1, d_2, d_3\}$ then the universal matching function $h1_{ij}(c_1) = \{d_1, d_2, d_3\}$ $h1_{ij}(c_2) = \{d_1, d_2, d_3\}$ has an AvMaxMatch of 1 (since it definitely links every element of $C_i$ to something in $D_j$), whereas $h2_{ij}(c_1) = \{d_1/0.9\}$ $h2_{ij}(c_2) = \{d_2/1, d_3/0.4\}$ would only have an AvMaxMatch of 0.95 although it is much more specific than $h1_{ij}$.

Thus when ordering attributes, we may alternatively take the average of the maximum probability from the least prejudiced distribution, AvMatch, which is defined as follows:

$$AvMatch(h_{ij}) = \frac{\sum_{x \in C_i} \max_{y \in D_j}(Pr(y \in LPD(h_{ij}(x))))}{|C_i|}$$

For the cases above:

$AvMatch(h1_{ij}) = 1/3$ $AvMatch(h2_{ij}) = 0.85$

This discriminates against matching functions $h_{ij}$ that are very unspecific.

It makes sense to choose key attributes $C_{key}$ and $D_{key}$ that are close to being "key" domains i.e. uniquely identifying an object. This can be estimated quite easily by looking for domains with cardinality equal to or close to the number of entries in the database. Key attributes can be identified by the database schema or by user guidance. In the absence of any information, selection of key attributes can be done by finding an attribute (or combination of attributes) which has a unique value for each row in the database, i.e. find all values and check that each occurs only once, or failing that, by finding an attribute which is near to satisfying this requirement relative to other attributes. This approximation allows the system for a level of noise to be taken account of.

Efficiency Considerations

The discussion above works with mass assignments over the universe B rather than a distribution on B since this avoids having to make assumptions about how to divide the mass on non-singleton sets. However, there is clearly an implementation problem since the power set of B has $2^{|B|}$ elements which is not feasible for large universes. We can constrain the size of our work space by requiring $M_i$ to correspond to a fuzzy set, he, to be a nested mass assignment. This simplifies both the representation and the processing involved. It turns out that we just need to consider the mean membership of each element; this is equivalent to taking an average mass assignment and then restricting it (by means of type-2 restrictions) until it is nested and hence corresponds to a fuzzy set.

When to Stop

We measure the effectiveness of each attribute pairing $(R_i \sim S_j)$ by monitoring the total entropy of h. We have, for each element $a_k$, a corresponding fuzzy set $B_k$ which is the current best estimate of the elements in B which match $a_k$.

We calculate the entropy of a nested mass assignment (fuzzy set) by creating the corresponding least prejudiced distribution $(b_i : p_i)$ and finding $$-\sum_i p_i \log_2(p_i)$$

This can be done quickly by putting the N elements in increasing order $i = 0 \ldots N-1$ $$p_i = p_{i-1} + \frac{\mu_i - \mu_{i-1}}{N-i} \text{ for } i = 1 \ldots N-1, \text{ with } p_0 = \mu_0/N$$

In the case of an incomplete mass assignment, it is assumed the mass is spread equally amongst all elements in the domain—this increases the entropy considerably.

This value is calculated for all fuzzy sets $B_k$, and the total represents the entropy of the current h. If this increases, then the last attribute pairing $(R_i \sim S_j)$ has made the approximate h less specific and so is rejected. It is assumed that lower ranked attribute pairs will also make the approximate h less specific and so the process stops.

Algorithm (Outline)

With reference to FIG. 9 and Appendix 2, the steps which may be carried out in implementing the above are briefly discussed below.

```
Inputs
    two chosen domains A, B
    sets of relations R_i, S_j and associated ranges C_i, D_j
    set of approximate matching functions h_ij which associate each
    element in C_i with a fuzzy set of elements in D_j
Output-a partial fuzzy mapping between A and B
Optional : verify that C_key and D_key are key domains i.e. have few repeated
elements for each a_k in C_key
        initialise B_k = D_key, i.e. for all b, μ_k(b)=1
end for
foreach pair R_i - S_j
        if background knowledge doesn't rule out this pair (e.g. from
        schema matching)
            find AvMatch (R_i, S_j)
            store in table if non-zero
end for
Sort table by decreasing AvMatch score (i.e. probability of
correspondence)
n:=0
while next (R_i-S_j) in table decreases the overall entropy of h
    for each a_k in A
```

$$\mu_k(b) := \frac{\mu_k(b) \times n + \mu_{ij}(b)}{n+1}$$

```
        end for
        n := n+1
endwhile
output h : a_k → μ_k(b) for all k and b
```

APPENDIX 2

Possible code steps that could be used to implement the algorithm of FIG. 9:

```
input:
    database db1, "key" attribute C_key, relations R_1...R_p
    database db2, "key" attribute D_key, relations S_1...S_q
initialization:
    for each a_k in C_key,
        h_0(a_k) = D_key
    endfor
    for each pair R_i, S_j
        if (R_i and S_j are compatible)
            calculate and store AvMaxMatch(R_i, S_j)
        endif
    endfor
merging:
    n:=0
    while next (R_i-S_j) in table decreases the overall entropy of h
        for each a_k in C_key
            calculate h_{n+1}(a_k) from h_n(a_k) and h_ij
        end for
        calculate entropy increase for h_{n+1}
        n := n+1
    endwhile
output:
    h_n, the approximate correspondence between C_key and D_key
```

The invention claimed is:

1. A system for processing data comprising:
a plurality of resource interfaces each of which is configured to access a corresponding underlying resource;
a processor unit for integrating data accessed from the underlying resources and controlling a user interface; and
a data store accessible by the processor unit for storing a user ontology comprising a plurality of concepts and mappings between the underlying resources and the concepts of the user ontology wherein:
the processor is configured to display to a user, via the user interface, a view of all of the underlying resources currently accessible to the system and to receive from the user, via the user interface, a user-selection of a plurality of these to form a subset comprising some, but not all, of the underlying resources from which to form an integrated view of the selected sub-set of resources, the processor being configured to generate the integrated view of the selected sub-set of underlying resources in response to the received user-selection by identifying which concepts in the user ontology are covered by the selected resources using the stored mappings and integrating the selected resources into as few groups as possible and forming for the or each formed group a pruned ontology by pruning the user ontology to remove any concepts not covered by any of the resources in the group and causing the intergrated view, comprising the or each pruned user ontology, to be displayed to the user via the user interface;
wherein the processor is further configured to receive, via the user interface, a user-entered query expressed in terms of the pruned ontology; and
wherein the processor is further configured to generate sub-queries for sending to respective underlying resources based on the user entered query and to retrieve in response to those sub-queries any relevant data associated with the user entered query from the respective resources of the selected sub-set of underlying resources and to automatically fuse results of the retrieved data and present the fused results in terms of the pruned ontology to the user via the user interface.

2. A system as claimed in claim 1 further including a storage unit for storing meta-data about each of the underlying resources for use in generating sub-queries.

3. A system according to claim 2 wherein the meta-data includes quality meta-data indicative of the perceived quality of the corresponding resource.

4. A system according to claim 3 wherein the processing unit is configured to generate a strategy for accessing underlying data from one or more of the underlying resources in response to a request for such data from the user and to provide this to the user, and wherein, where a plurality of viable strategies exist for answering a user query, the processing unit is configured to select one of the viable strategies in dependence upon the quality meta-data associated with each of the underlying resources.

5. A method for processing data accessible from a plurality of underlying resources via a corresponding plurality of resource interfaces each of which is operable to access its corresponding underlying resource, the method comprising:
storing a user ontology comprising a plurality of concepts and mappings between the underlying resources and the concepts of the user ontology,
controlling a user interface to display to a user a view of all of the underlying resources currently accessible to the system
receiving via the user interface a user selection of a plurality of these to form a subset comprising some, but not all, of the underlying resources from which to form an integrated view of the sub-set;
generating the integrated view of the selected sub-set of underlying resources by identifying which concepts in the user ontology are covered by the selected resources using the stored mappings and integrating the selected resources into as few groups as possible and forming for the or each formed group a pruned ontology by pruning the user ontology to remove any concepts not covered b an of the resources in the group and displaying the integrated view, comprising the or each pruned user ontology, via the user interface;
receiving via the user interface a user-entered query expressed in terms of the pruned ontology;
generating sub-queries for sending to respective underlying resources of the selected sub-set of underlying resources,
retrieving in response to those sub-queries any relevant data associated with the user entered query from the respective resources of the selected sub-set of underlying resources, and
automatically fusing results of the retrieved data and presenting the fused results in terms of the pruned ontology to the user via the user interface.

6. A method according to claim 5 further comprising storing meta-data about each of the underlying resources for use in generating sub-queries.

7. A method according to claim 6 wherein the meta-data includes quality meta-data indicative of the perceived quality of the corresponding resource.

8. A method according to claim 7 further comprising generating a strategy for accessing underlying data from one or more of the underlying resources in response to a request for such data from the user, wherein, where a plurality of viable strategies exist for answering a user query, one of the viable strategies is selected in dependence upon the quality meta-data associated with each of the underlying resources.

9. A non-transitory computer-readable storage medium carrying instructions which upon execution by a computer perform the method of claim 5.

10. A computer processing system comprising at least one computer processor, the computer processing system being configured at least to:

process data accessible from a plurality of underlying resources via a corresponding plurality of resource interfaces each of which is operable to access its corresponding underlying resource;

access a data store storing a user ontology comprising a plurality of concepts and mappings between the underlying resources and the concepts of the user ontology;

generate a display for a user, via a user interface, of a view of the underlying resources currently accessible to the computer processing system;

receive from the user, via the user interface and the view of the underlying resources currently accessible to the computer processing system, a user-selection of a plurality of resources to form a partial subset of the underlying resources;

integrate the user selected resources forming the partial subset into one or more groups so that the number of the one or more groups is less than the number of user selected resources forming the partial subset;

form a pruned ontology from the one or more groups by removing any concept not related to any of the resources in the one or more group;

generate and display a view of the pruned ontology;

receive, via the user interface and the displayed view of pruned ontology, a user entered query;

generate and send sub-queries to respective underlying resources based on the user entered query;

retrieve, in response to the sub-queries, data associated with the user entered query from the underlying resources corresponding to the pruned ontology formed from the one or more groups of user selected resources forming the partial subset; and automatically fuse results of the retrieved data and present the fused results to the user via the user interface.

* * * * *

UNITED STATES PATENT AND TRADEMARK OFFICE
CERTIFICATE OF CORRECTION

PATENT NO. : 8,375,029 B2 Page 1 of 1
APPLICATION NO. : 12/447283
DATED : February 12, 2013
INVENTOR(S) : Cui et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 423 days.

Signed and Sealed this
First Day of September, 2015

Michelle K. Lee
*Director of the United States Patent and Trademark Office*